United States Patent
Cay et al.

(10) Patent No.: US 12,373,720 B1
(45) Date of Patent: Jul. 29, 2025

(54) HYBRID QUANTUM/NONQUANTUM APPROACH TO NP-HARD COMBINATORIAL OPTIMIZATION

(71) Applicant: SAS Institute Inc., Cary, NC (US)

(72) Inventors: Sertalp Bilal Cay, Raleigh, NC (US); William Lloyd Wisotsky, Dix Hills, NY (US); Charlotte Kay Crain, Gig Harbor, WA (US); Jinxin Yi, Cary, NC (US); Pelin Cay, Raleigh, NC (US); Justin Joseph Lukas, Charlotte, NC (US); Bryan Christopher Harris, Cary, NC (US); Alexius Kofi Ameyaw Boakye, Jr., Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/814,869

(22) Filed: Aug. 26, 2024

Related U.S. Application Data

(60) Provisional application No. 63/631,793, filed on Apr. 9, 2024, provisional application No. 63/567,691, filed on Mar. 20, 2024.

(51) Int. Cl.
   *G06N 10/20* (2022.01)
   *G06F 17/11* (2006.01)

(52) U.S. Cl.
   CPC .............. *G06N 10/20* (2022.01); *G06F 17/11* (2013.01)

(58) Field of Classification Search
   CPC .................................. G06N 10/20; G06F 17/11
   See application file for complete search history.

(56) References Cited

U.S. PATENT DOCUMENTS

| 8,018,953 B1 | 9/2011 | Zhao |
| 2017/0255629 A1* | 9/2017 | Thom .................... G06N 10/60 |
| 2020/0257987 A1 | 8/2020 | McGeoch et al. |
| 2023/0419155 A1 | 12/2023 | You et al. |

(Continued)

FOREIGN PATENT DOCUMENTS

| IN | 202311075209 | 1/2023 |
| IN | 202311072102 | 11/2023 |

(Continued)

OTHER PUBLICATIONS

Tran et al. "A Hybrid Quantum-Classical Approach to Solving Scheduling Problems", AAAI, 2016, pp. 9.*

(Continued)

*Primary Examiner* — Li Wu Chang
(74) *Attorney, Agent, or Firm* — Bell & Manning, LLC

(57) ABSTRACT

A system and method include reformulating an optimization program as a Quadratic Unconstrained Binary Optimization (QUBO) model and in a single iteration, solving the optimization program by inputting the QUBO model into a quantum computing solver, instructing the quantum computing solver to generate a plurality of solutions to the optimization program based on the QUBO model, receiving the plurality of solutions from the quantum computing solver, inputting each of the plurality of solutions into a nonquantum computing solver, wherein the nonquantum computing solver uses each of the plurality of solutions as a starting point to continue solving the optimization program, and outputting an optimal solution to the optimization program from the nonquantum computing solver.

30 Claims, 26 Drawing Sheets

(56) References Cited

U.S. PATENT DOCUMENTS

| | | | |
|---|---|---|---|
| 2024/0054374 A1 | 2/2024 | Genin et al. | |
| 2024/0062096 A1 | 2/2024 | Farquhar | |
| 2024/0086158 A1 | 3/2024 | Shi et al. | |

FOREIGN PATENT DOCUMENTS

| | | | |
|---|---|---|---|
| IN | 202341090165 | | 1/2024 |
| IN | 202347088046 | | 1/2024 |
| WO | 2024028281 | A1 | 2/2024 |
| WO | 2024056755 | A1 | 3/2024 |

OTHER PUBLICATIONS

Zhao et al. "Hybrid Quantum Benders' Decomposition For Mixed-integer Linear Programming", IEEE WCNC, 2022, pp. 2536-2540.*

International Search Report and Written Opinion in International Patent Application No. PCT/U82024/059716 dated Jan. 31, 2025, 11 pages.

Ameca-Alducin, et al., "On the Use of Repair Methods in Differential Evolution for Dynamic Constrained Optimization," In: Lecture Notes in Computer Science, March 2018, 17 pages, retrieved on January 22, 2025, https://www.researchgate.net/publication/323619406.

Fernandez-Villaverde, et al., "Dynamic Programming in Ecomonics on a Quantum Annealer," In: University of Pennsylvania, Jan. 23, 2024, 48 pages, retrieved on Jan. 22, 2025, https://www.sas.upenn.edu/~jesusfv/Solving_Quantum.pdf.

Leprince-Ringuet, Daphne. "Quantum computing: Quantum annealing versus gate-based quantum computers." ZDNet, Mar. 11, 2021.

Yarkoni, Sheir, et al. "Quantum annealing for industry applications: Introduction and review." Reports on Progress in Physics 85.10 (2022): 104001.

Satsangi, Shreya. "Demystifying Quantum Computing: Gate-Based vs. Quantum Annealers (QML-2)." Medium.com. Oct. 23, 2023. https://medium.com/@shreyasatsangi27/demystifying-quantum-computing-gate-based-vs-quantum-annealers-qml-2-c4e21e1ccc94. Accessed on Apr. 8, 2024.

Brown, Robin, et al. "A copositive framework for analysis of hybrid Ising-classical algorithms." SIAM Journal on Optimization 34.2 (2024): 1455-1489.

Glover, Fred. "Heuristics for integer programming using surrogate constraints." Decision sciences 8.1 (1977): 156-166.

Misener, Ruth, and Christodoulos A. Floudas, "Global optimization of mixed-integer quadratically-constrained quadratic programs (MIQCQP) through piecewise-linear and edge-concave relaxations." Mathematical Programming 136.1 (2012): 155-182.

International Search Report and Written Opinion in International Patent Application No. PCT/US2024/059716 dated Jan. 31, 2025, 11 pages.

Ameca-Alducin, et al., "On the Use of Repair Methods in Differential Evolution for Dynamic Constrained Optimization," In: Lecture Notes in Computer Science, Mar. 2018, 17 pages, retrieved on Jan. 22, 2025, https://www.researchgate.net/publication/323619406.

Abbas, et al., "Challenges and Opportunities in Quantum Optimization," Nov. 17, 2024, 72 pages.

Clautiaus, et al., "Last fifty years of integer linear programming: A focus on recent practical advances," European Journal of Operational Research, Aug. 1, 2025, pp. 707-731, vol. 324, Issue 3, https://doi.org/10.1016/j.ejor.2024.11.018.

Examination Report in AU Patent Application No. 2024323228 dated May 9, 2025, 6 pages.

Fukada, et al., "A three-stage annealing method solving slot-placement problems using an Ising machine," IEEE Access, 2021, 14 pages, vol. 9, Digital Object Identifier 10.1109/ACCESS.2021.3116038.

* cited by examiner

HYBRID QUANTUM/NONQUANTUM APPROACH TO NP-HARD COMBINATORIAL OPTIMIZATION

CROSS-REFERENCE TO RELATED APPLICATIONS

This application is a non-provisional of provisional application No. 63/631,793 filed on Apr. 9, 2024, and of provisional application No. 63/567,691 filed on Mar. 20, 2024, the entireties of which are incorporated by reference herein.

BACKGROUND

A combinatorial optimization problem is considered non-deterministic polynomial time (NP) hard if for every problem P that may be solved in polynomial time, there exists a polynomial time reduction from the NP-hard problem to P. In other words, the solution of a problem P may be used to solve another problem P' in polynomial time. Some large-scale NP-hard combinatorial optimization problems are challenging to solve using classical computing devices. Quantum computing devices are increasingly being explored to assist with such large-scale NP-hard combinatorial optimization problems, either alone or in combination with classical computing devices. However, current quantum or quantum/classical hybrid computing devices are limited in their configuration and their ability to solve such large-scale NP-hard combinatorial optimization problems.

SUMMARY

In accordance with at least some aspects of the present disclosure, a non-transitory computer-readable medium having computer-readable instructions stored thereon is disclosed. The computer-readable instructions when executed by a processor cause the processor to reformulate an optimization program as a Quadratic Unconstrained Binary Optimization (QUBO) model and in a single iteration, solve the optimization program by inputting the QUBO model into a quantum computing solver, instructing the quantum computing solver to generate a plurality of solutions to the optimization program based on the QUBO model, receiving the plurality of solutions from the quantum computing solver, inputting each of the plurality of solutions into a nonquantum computing solver, wherein the nonquantum computing solver uses each of the plurality of solutions as a starting point to continue solving the optimization program, and outputting an optimal solution to the optimization program from the nonquantum computing solver.

In accordance with at least some other aspects of the present disclosure, a system is disclosed. The system includes a memory having computer-readable instructions stored thereon and a processor that executes the computer-readable instructions to reformulate an optimization program as a Quadratic Unconstrained Binary Optimization (QUBO) model, and in a single iteration, solve the optimization program by inputting the QUBO model into a quantum computing solver, instructing the quantum computing solver to generate a plurality of solutions to the optimization program based on the QUBO model, receiving the plurality of solutions from the quantum computing solver, inputting each of the plurality of solutions into a nonquantum computing solver, wherein the nonquantum computing solver uses each of the plurality of solutions as a starting point to continue solving the optimization program, and outputting an optimal solution to the optimization program from the nonquantum computing solver.

In accordance with at least some other aspects of the present disclosure, a method is disclosed. The method includes reformulating, by a processor executing computer-readable instructions stored on a memory an optimization program as a Quadratic Unconstrained Binary Optimization (QUBO) model, and in a single iteration, solving, by the processor, the optimization program by inputting, by the processor, the QUBO model into a quantum computing solver, instructing, by the processor, the quantum computing solver to generate a plurality of solutions to the optimization program based on the QUBO model, receiving, by the processor, the plurality of solutions from the quantum computing solver, inputting, by the processor, each of the plurality of solutions into a nonquantum computing solver, wherein the nonquantum computing solver uses each of the plurality of solutions as a starting point to continue solving the optimization program, and outputting, by the processor, an optimal solution to the optimization program from the nonquantum computing solver.

The foregoing summary is illustrative only and is not intended to be limiting in any way. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
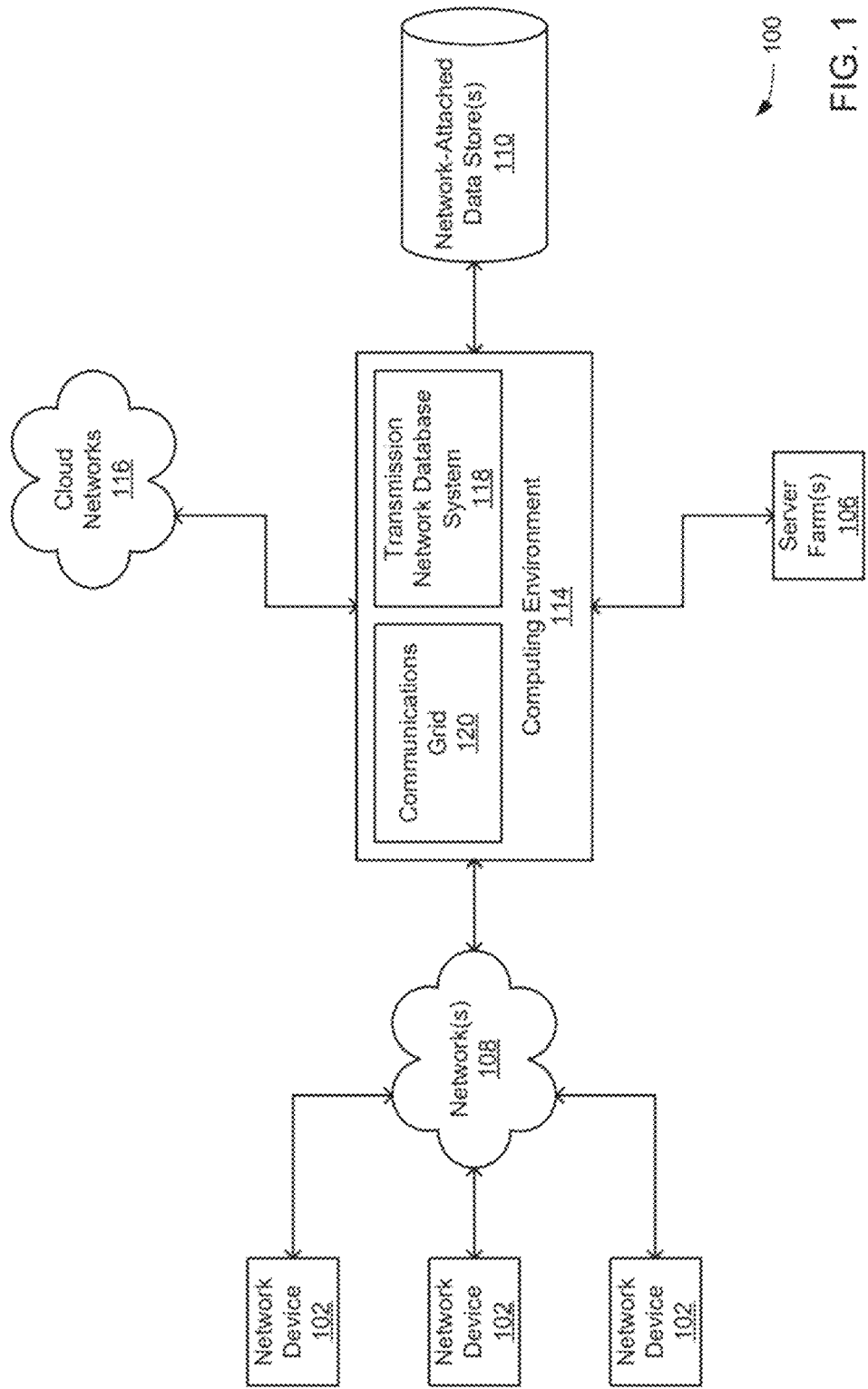
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
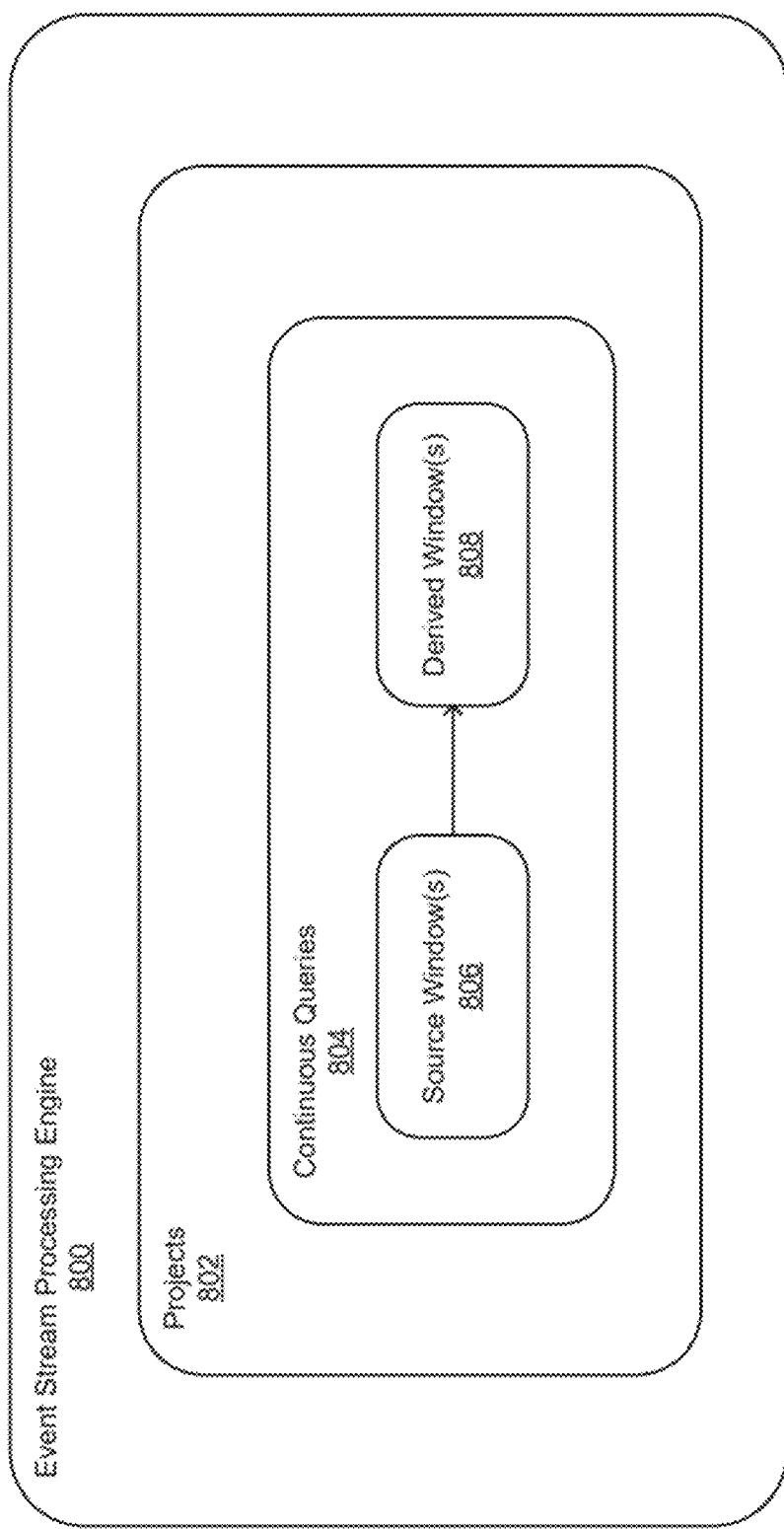
FIG. 8 illustrates a block diagram including components of an Event Stream Processing Engine (ESPE), according to embodiments of the present technology.
Figure 9:
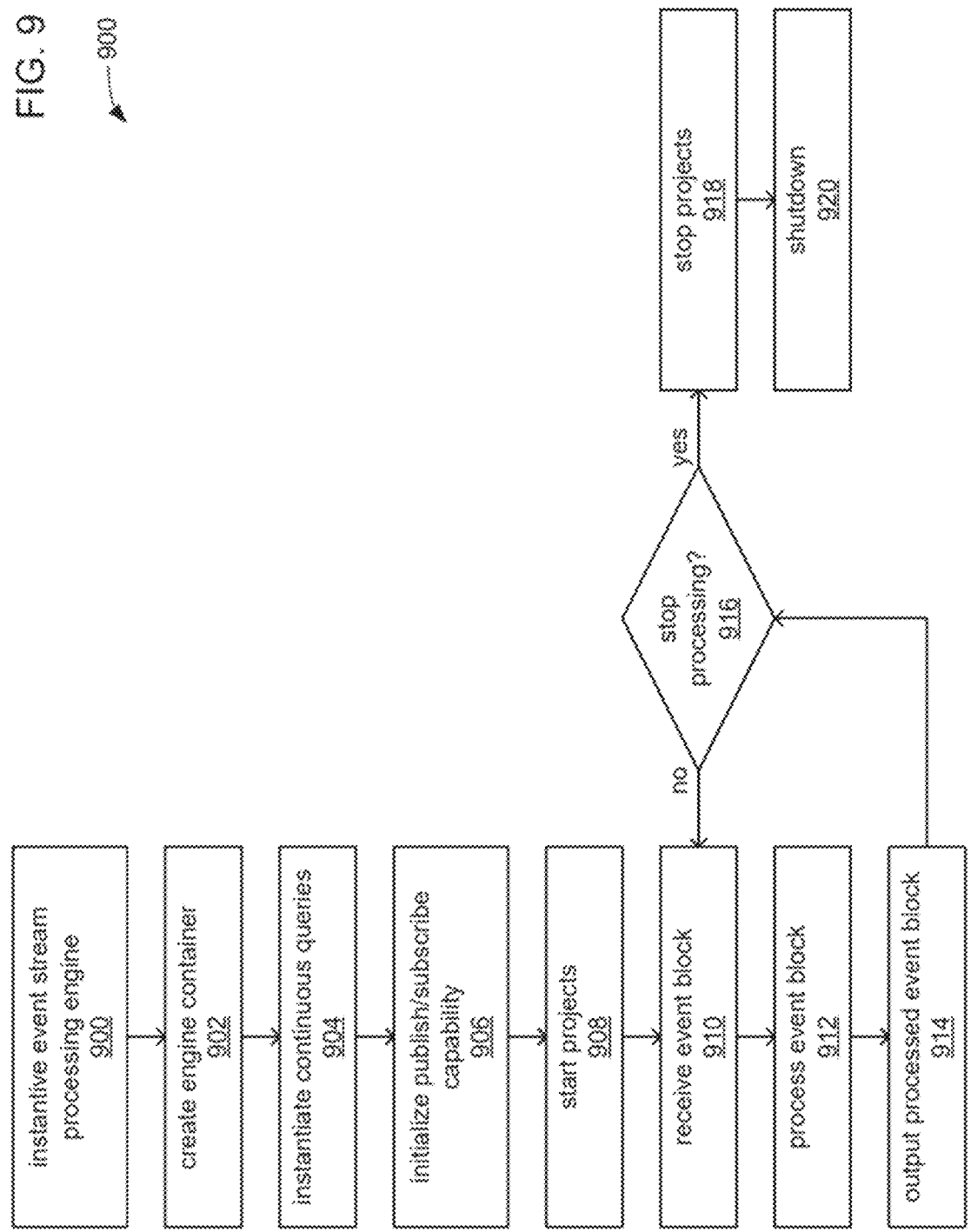
FIG. 9 illustrates a flow chart showing an example process including operations performed by an event stream processing engine, according to some embodiments of the present technology.
Figure 10:
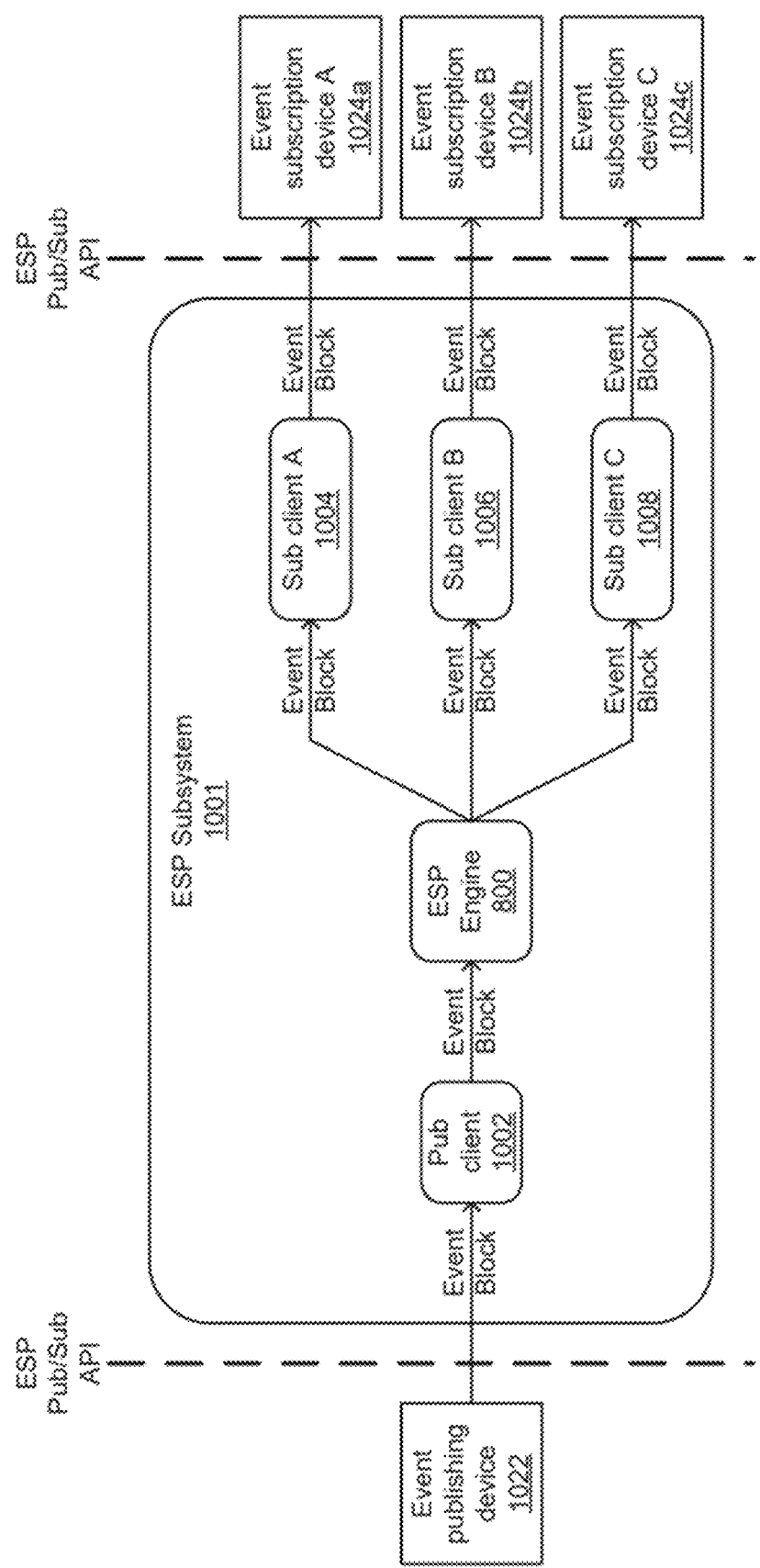
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
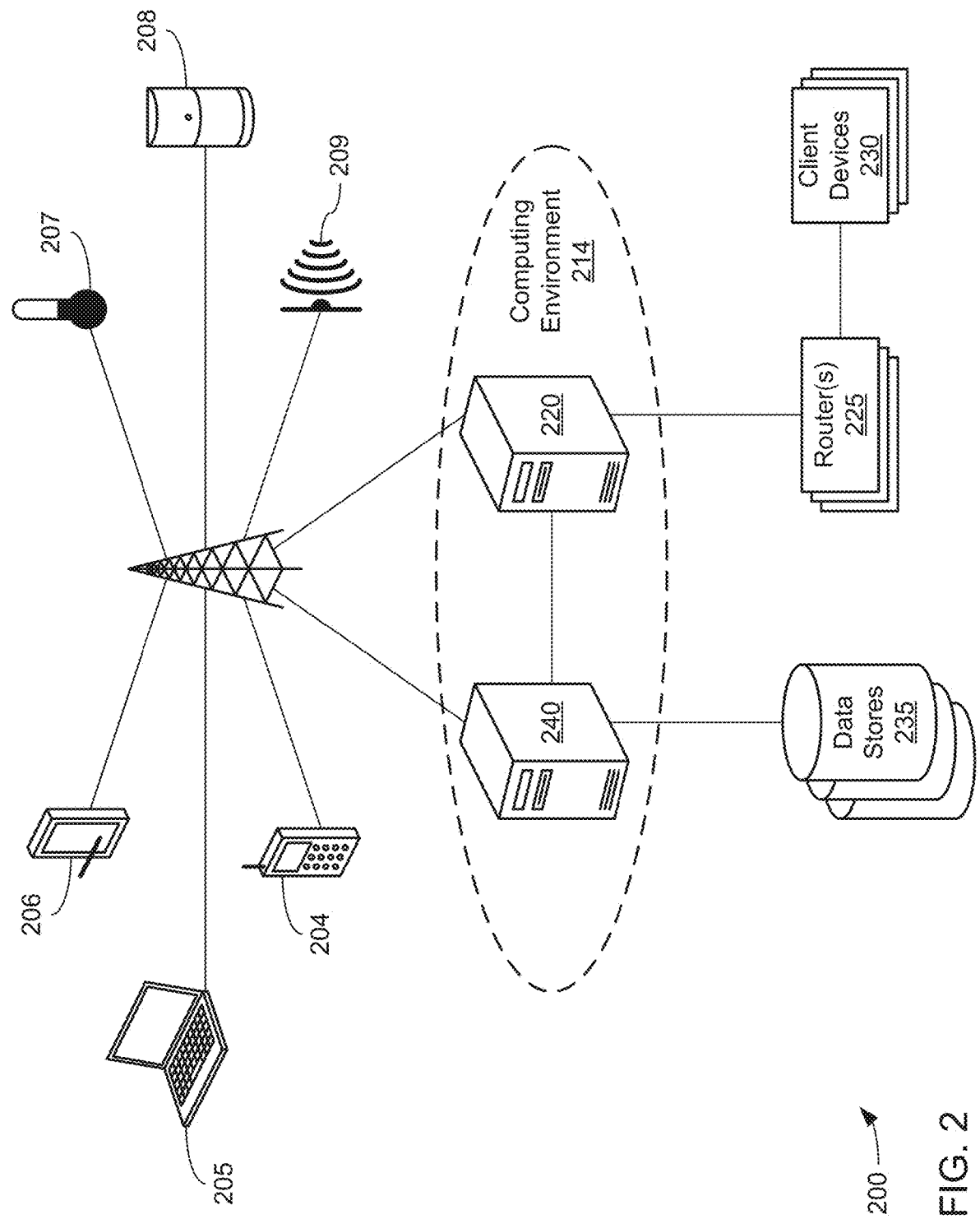
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
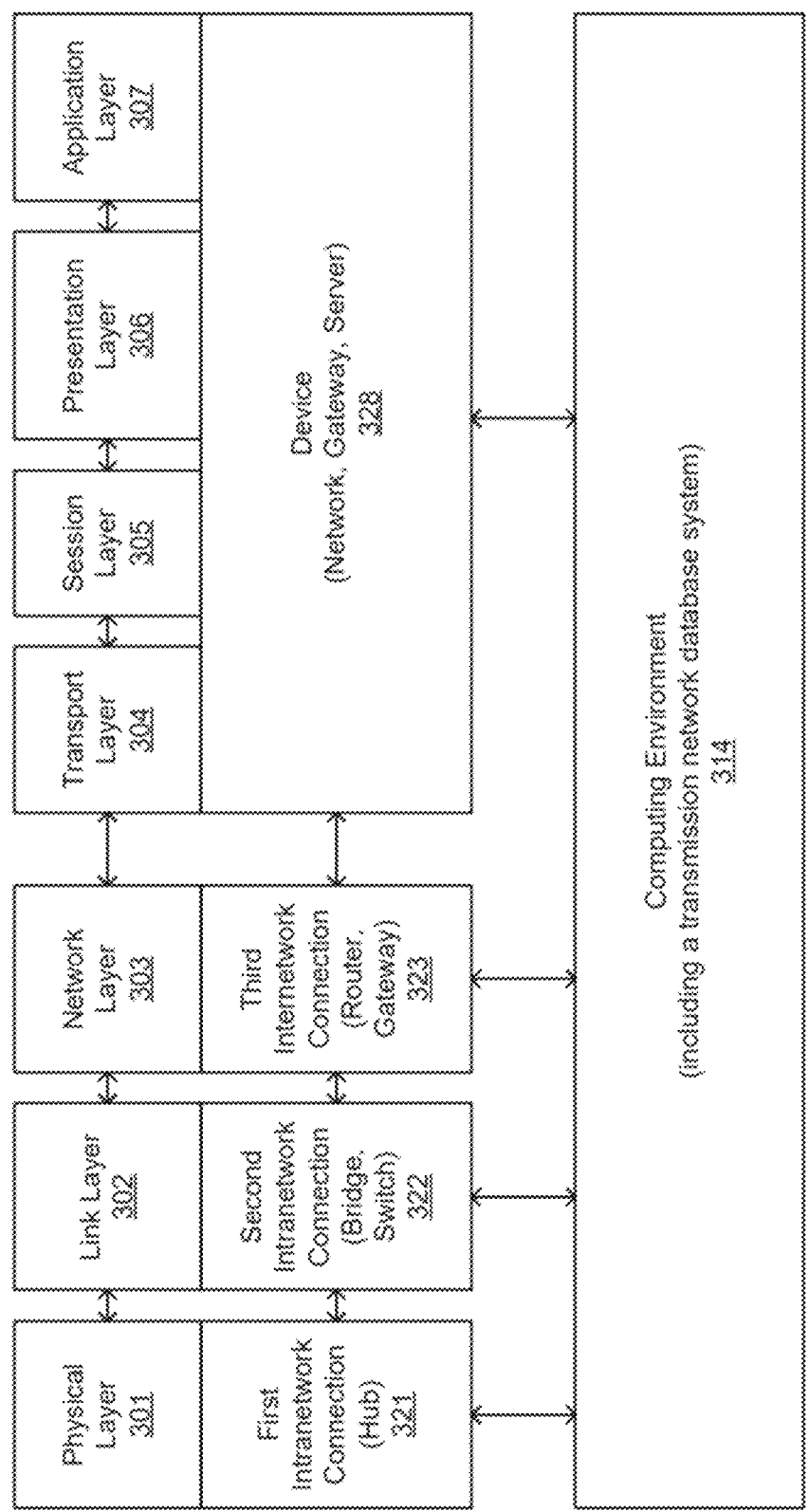
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
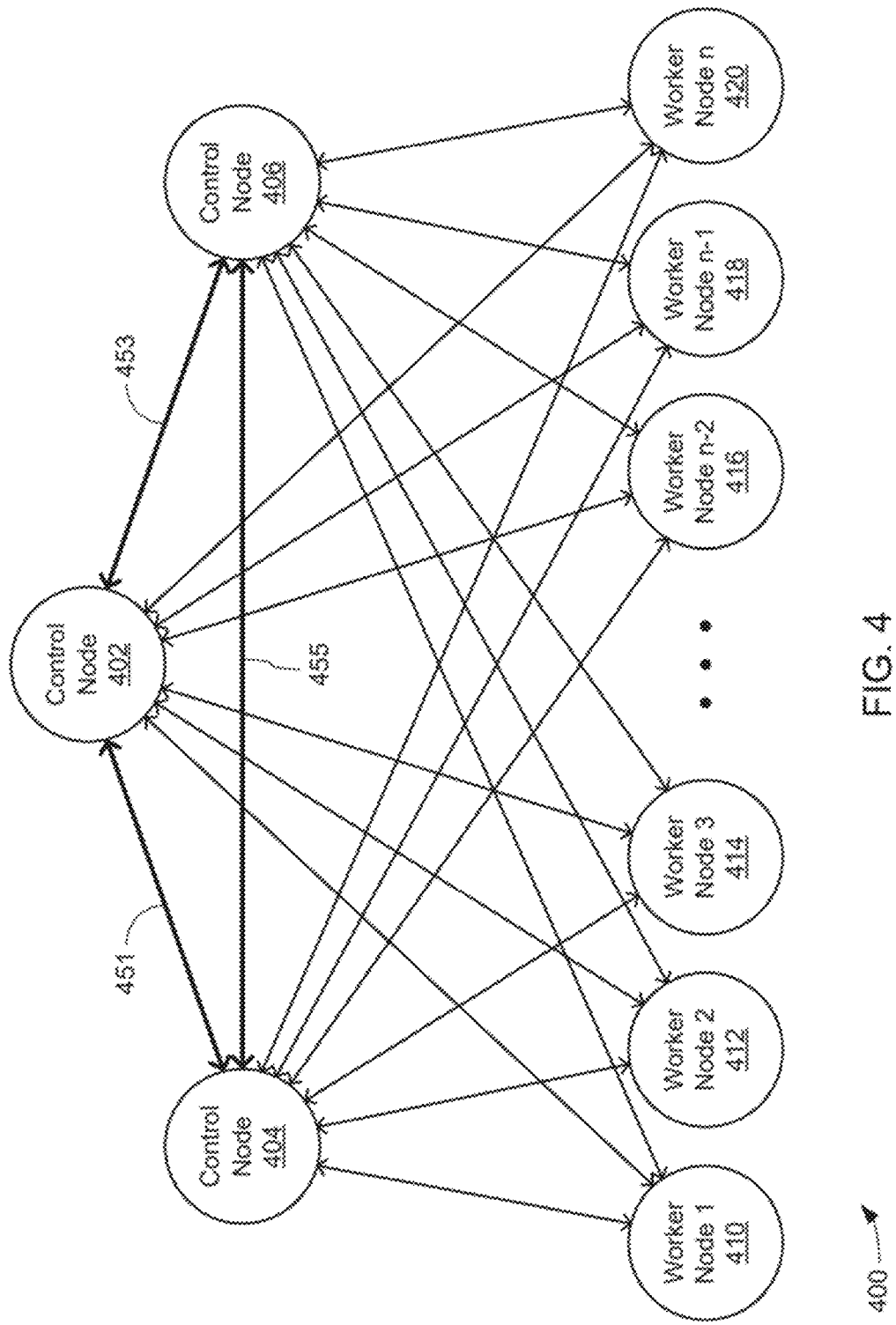
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
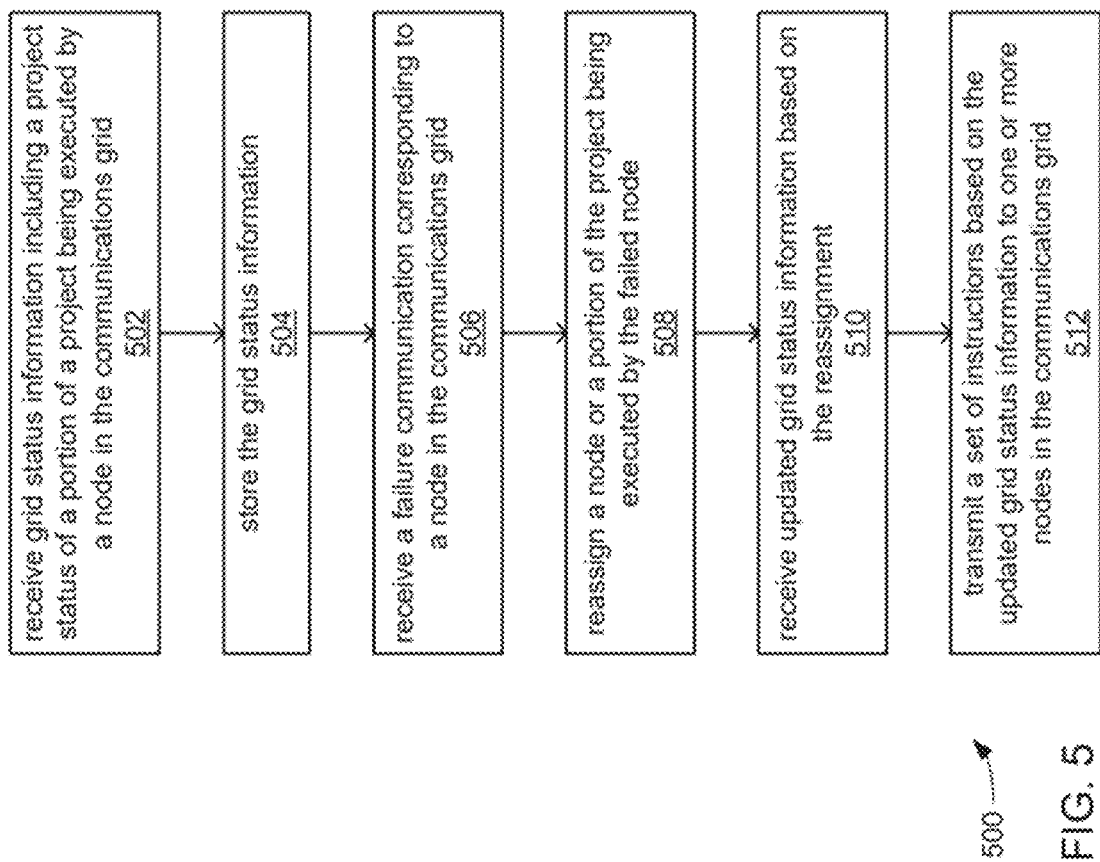
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
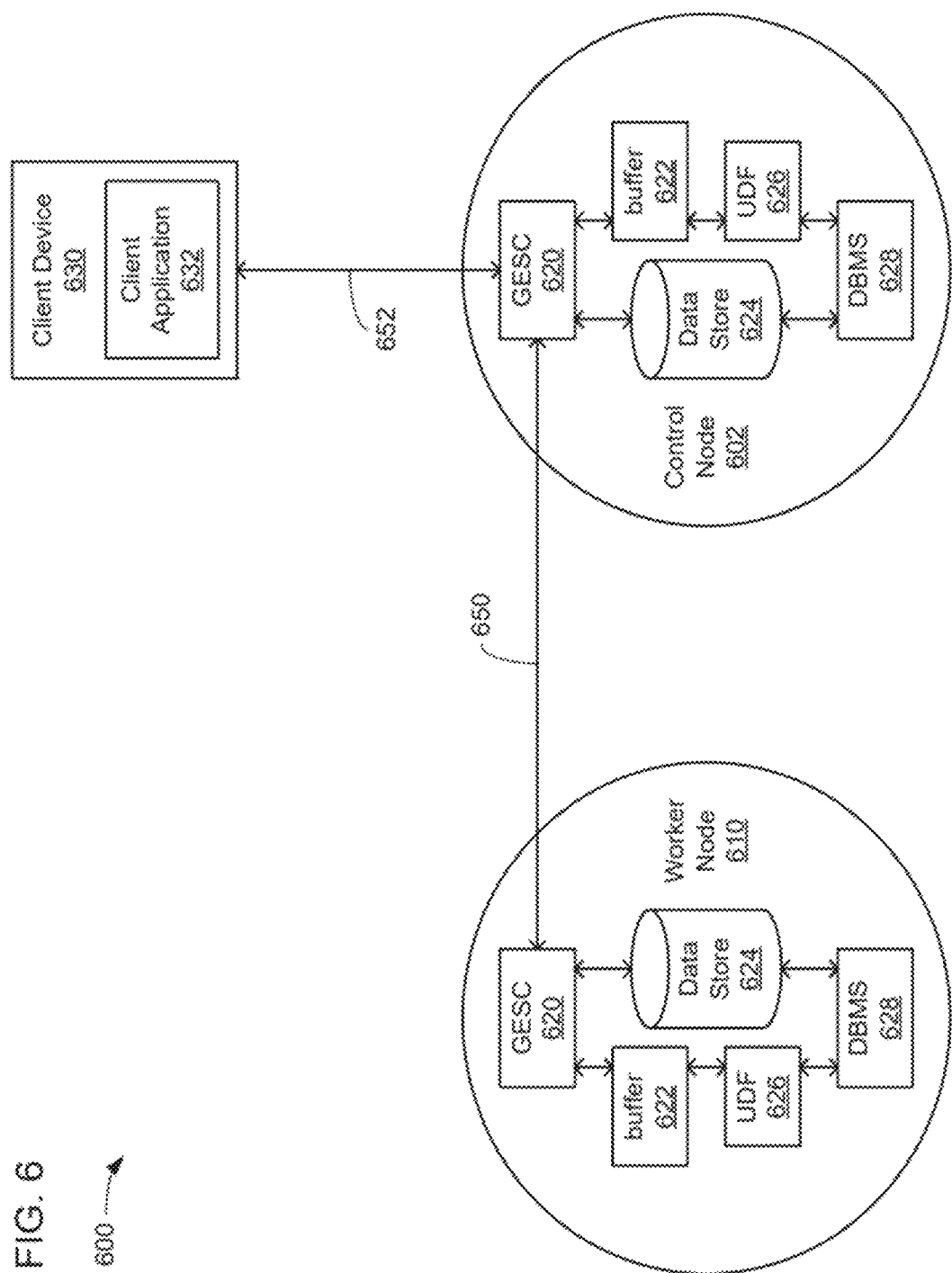
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
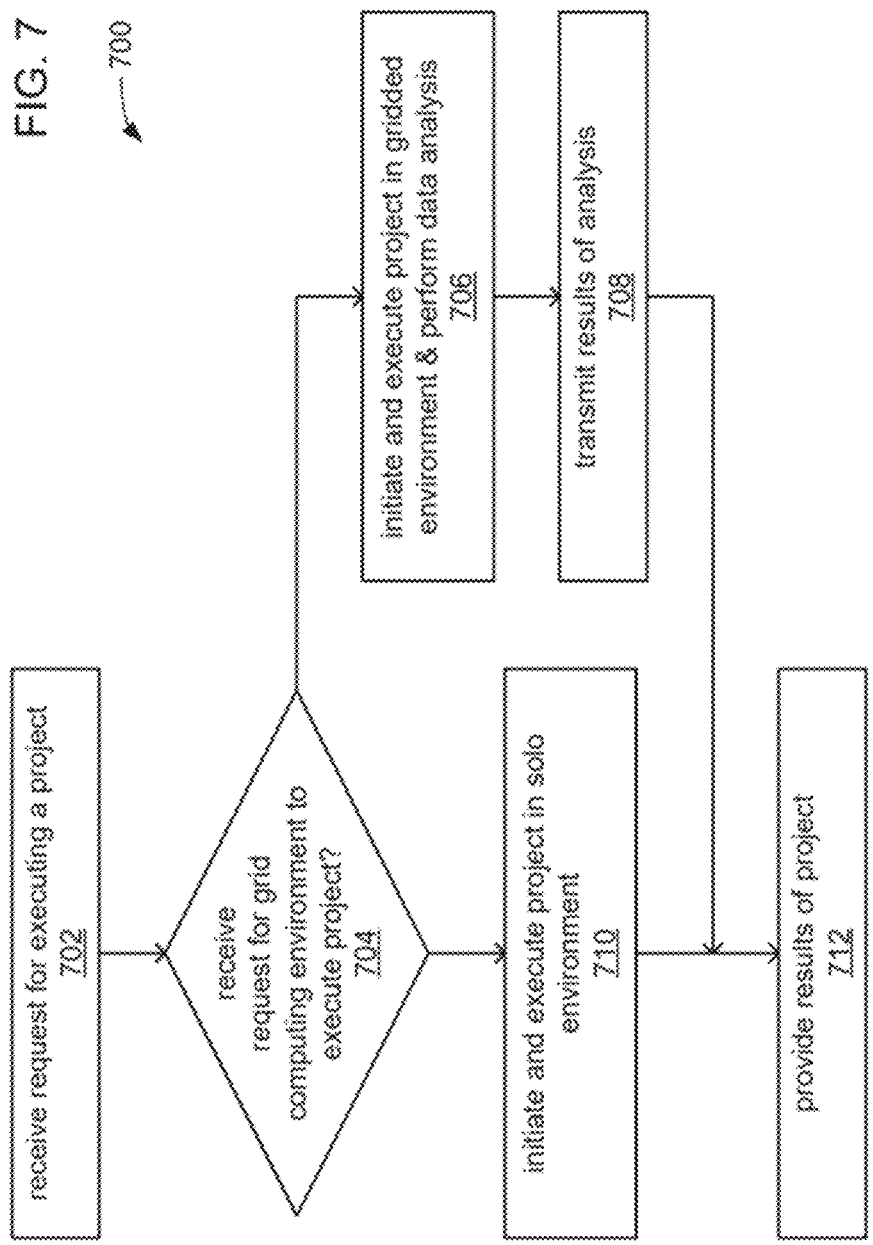
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
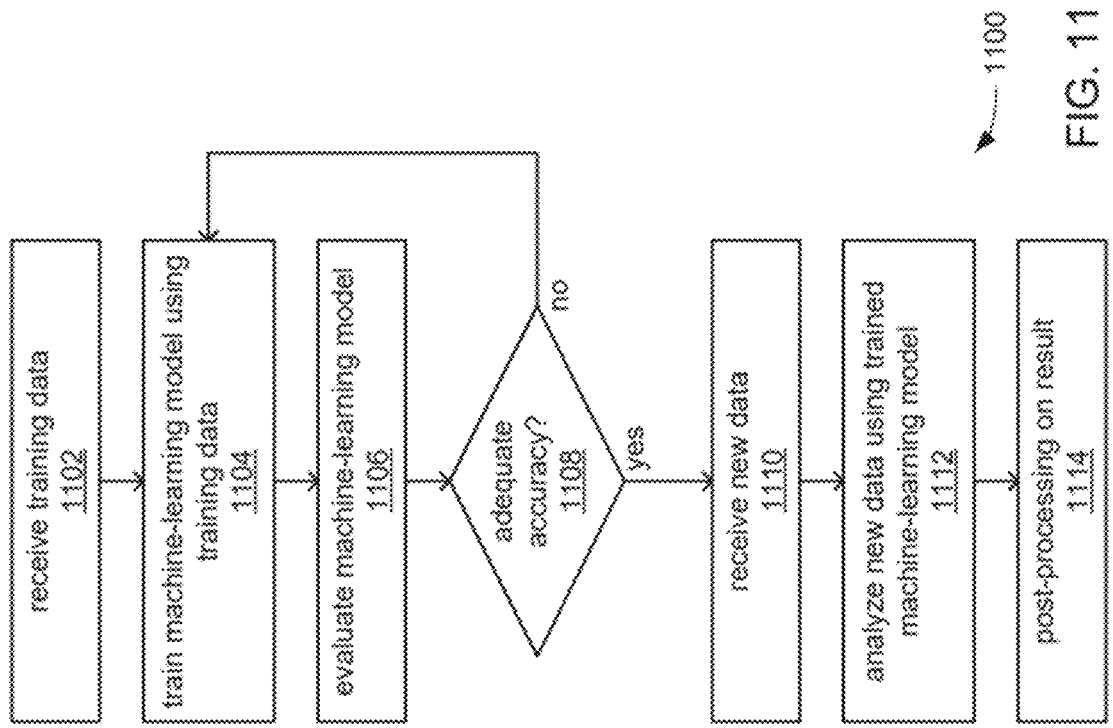
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
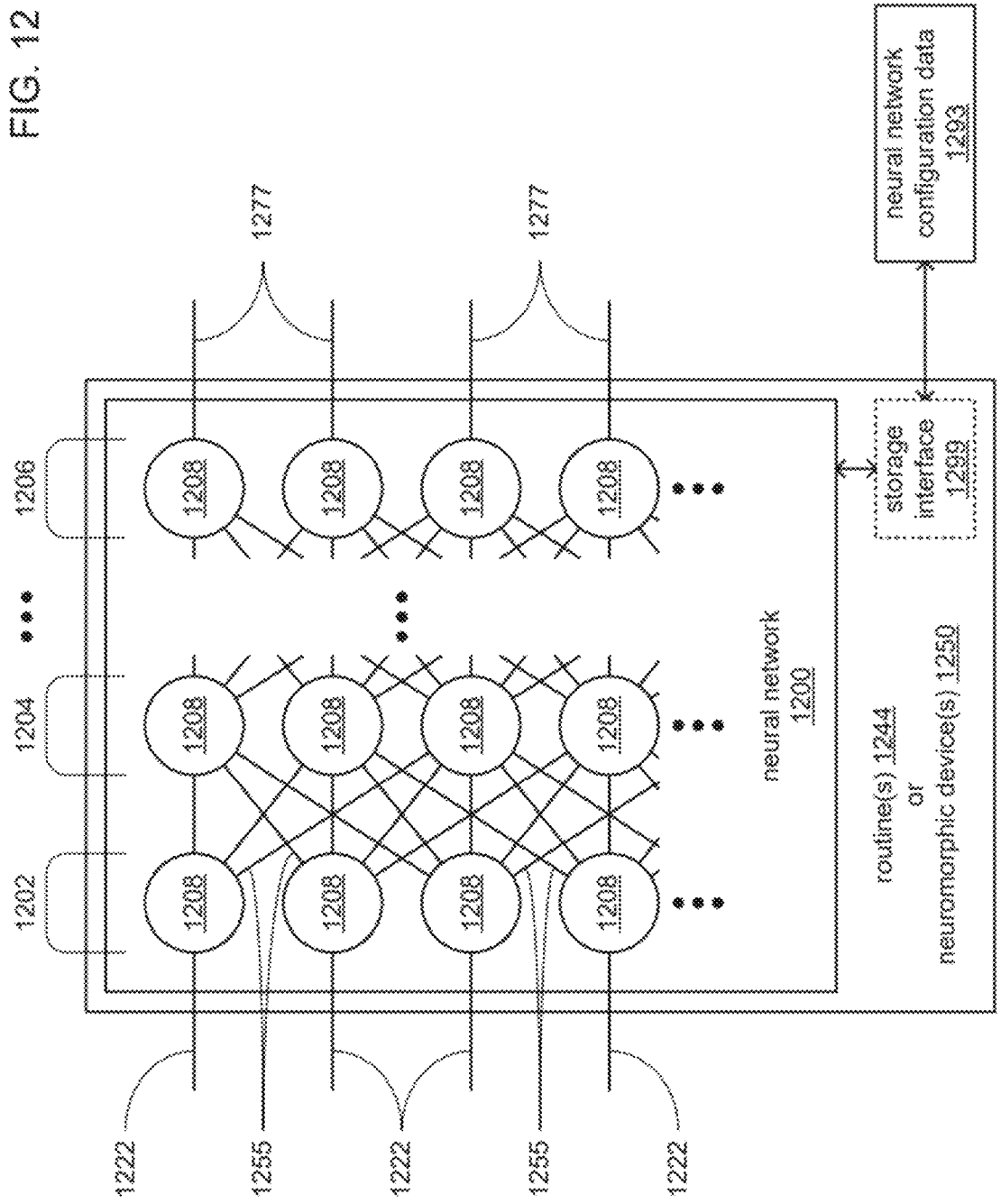
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
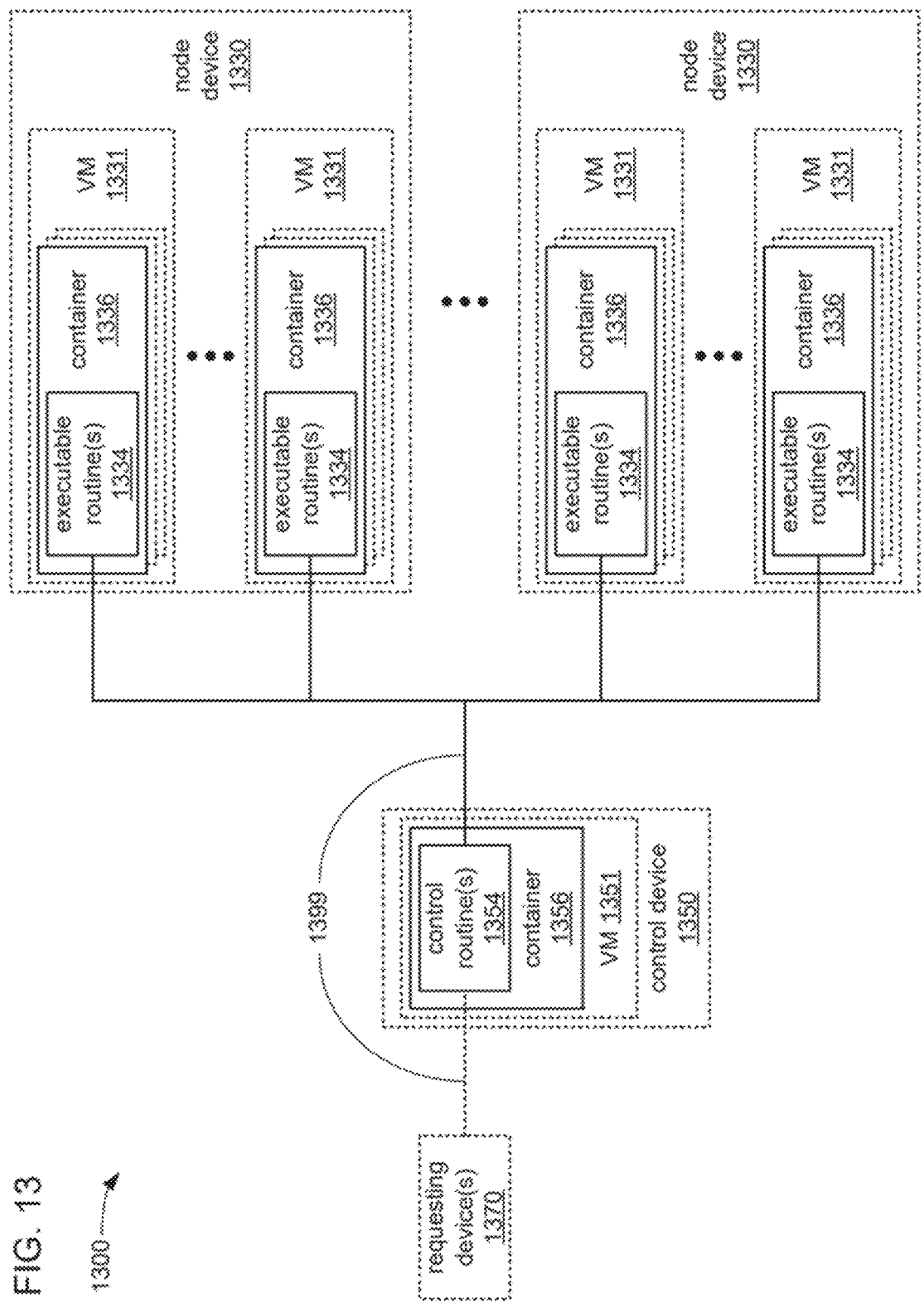
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged.

It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to optimizing NP-hard combinatorial optimization programs. An optimization program may also be referred to as an optimization problem. An optimization program is a problem or task of finding the best solution (also referred to herein as an optimal solution) from all feasible solutions. The present disclosure uses a hybrid quantum/nonquantum computing system to solve the optimization program. Large scale optimization programs pose significant challenges for conventional nonquantum (e.g., classical) solvers. An optimization program may be represented in terms of variables and constraints that define an objective function. The objective function may represent or be indicative of an objective or goal that the optimization program is intended to achieve. Real-world applications may include hundreds or thousands of variables and hundreds or thousands of constraints. Solving such large-scale optimization programs may entail finding an optimal solution to the optimization program. The optimal solution may correspond to a minimized or maximized value of the objective function that satisfies all the constraints.

Such large-scale optimization programs may not be practically solved in the human mind or using pen and paper. Complex computing devices may be needed to solve such large-scale optimization programs. However, as the number of variables and constraints increase in the objective function, even conventional nonquantum solvers struggle to solve these large-scale optimization problems, partially due to difficulty in handling the complexity resulting from super-linear or exponential increase in the computational effort that is required. In some cases, a conventional nonquantum solver may compromise optimality to sub-optimal solutions to conserve computational resources and/or provide a solution in a reasonable amount of time. Thus, conventional nonquantum solvers suffer from scalability problems and reduced ability to provide optimal solutions.

To address the problems associated with conventional nonquantum solvers, hybrid quantum/nonquantum solvers have recently gained popularity. Conventional hybrid quantum/nonquantum solvers use a variational approach. An example of such a conventional hybrid quantum/nonquantum solver is Quantum Approximate Optimization Algorithm (QAOA). QAOA divides an optimization program into sub-processes, with certain sub-processes being executed in the quantum solver and other sub-processes being executed in the nonquantum solver. The quantum solver adjusts variational parameters as coefficients to a computed problem. The nonquantum solver runs an optimization algorithm that optimizes parameters from each run to the next and sends the optimized parameters to the quantum solver. The quantum solver then uses these new optimized parameters as new coefficients.

Due to noise and decoherence in quantum computers, it is necessary to limit the quantum processing time to run in less time than it takes to decohere. Therefore, QAOA limits the processing time of the quantum solver and puts the rest of computing into the nonquantum solver as a way to deal with noise and decoherence. QAOA works by combing the cost and mixer Hamiltonians and embedding it into a layered parameterized quantum circuit allowing for a time evolution. The process starts with an initial best guess for the parameters, then solves the Hamiltonian with an approximate solution and then the parameters get optimized conventionally. This process repeats until the parameters cannot be optimized any further and then the final parameters are read out as the solution.

Due to the constant looping and back and forth between the quantum and nonquantum solvers, QAOA has limitations. For example, QAOA solution time is not much better than a conventional nonquantum solver's solution time alone. To improve QAOA's performance, the number of layers in the quantum solver have to be increased. However, increasing the number of layers increases the complexity of the quantum solver. An even bigger issue is that QAOA is extremely limited by the number of variables and constraints it can handle, which is dictated by the size of the current hardware available. Increasing the number of layers increases the amount time spent in the quantum solver, thus threatening the outcome to be more greatly affected by noise and decoherence. Thus, with QAOA, either the number of layers needs to be increased risking greater noise and decoherence or the quantum-nonquantum loop needs to be repeated a greater number of times, both of which are undesirable options.

The present disclosure provides technical solutions that address the problems above. For example, the present disclosure provides a hybrid quantum/nonquantum computing system that addresses the problems associated with QAOA. In particular, the hybrid quantum/nonquantum computing system of the present disclosure does not use a parameter variational approach. In other words, there is no variational modification of any parameters between the quantum and nonquantum stages. The present disclosure provides a single linear 2-stage pathway with no loops between quantum and nonquantum stages to solve an optimization program accurately and significantly faster than the conventional approaches. Because there are no loops involved between the quantum and nonquantum stages, the proposed disclosure is able to solve a large-scale optimization program significantly faster than QAOA and nonquantum solvers alone. Further, the proposed approach uses a quantum annealer instead of a gate-based design in the quantum stage to minimize hardware complexity of the quantum stage.

The proposed approach also does not divide the optimization programs into sub-processes like QAOA. Rather, the proposed approach solves the entire optimization program in the quantum stage to generate a plurality of intermediate solutions. The nonquantum solver then uses this plurality of intermediate solutions as a starting point to continue solving the optimization program to optimality. Because the nonquantum solver uses the intermediate solutions as a starting point, the overall complexity of hardware and time needed for processing in the nonquantum stage is reduced. Thus, the proposed approach provides technical improvements of less complex hardware, faster computing time, and more accurate results compared to the conventional approaches.

Figure 14:
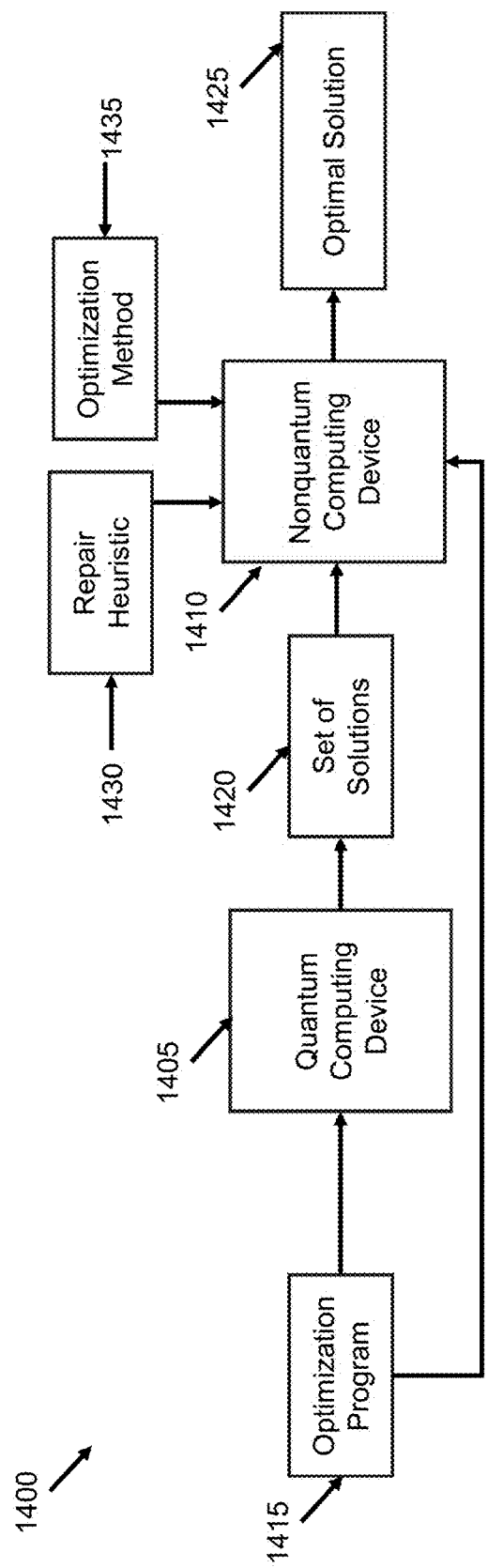
FIG. 14 illustrates a block diagram of an example hybrid quantum/nonquantum computing system having a quantum computing device and a nonquantum computing device, according to embodiments of the present technology.

Turning to FIG. 14, a block diagram of an example hybrid computing system 1400 is shown, in accordance with some embodiments of the present disclosure. The hybrid computing system 1400 includes a quantum computing device 1405 is communication with a nonquantum computing device 1410. The quantum computing device 1405 may be communicatively connected to the nonquantum computing device 1410 over any of a variety of suitable networks. In some embodiments, the quantum computing device 1405 and the nonquantum computing device 1410 may be located remote from each other. In other embodiments, the quantum computing device 1405 and the nonquantum computing device 1410 may be locally located. The quantum computing device 1405 and the nonquantum computing device 1410 provide a hybrid two-stage linear system or pathway that is configured to solve an optimization program 1415. In particular, to solve the optimization program 1415, the optimization program is input into both the quantum computing device 1405 and the nonquantum computing device 1410. Based on the optimization program 1415, the quantum computing device 1405 generates a plurality of solutions 1420, which are then input into the nonquantum computing device 1410.

The nonquantum computing device 1410 uses the plurality of solutions 1420 as starting points to generate an output, which may be an optimal solution 1425 to the optimization program 1415. In some embodiments, the optimal solution 1425 may be the best feasible solution that is generated within one or more predefined thresholds. For example, in some embodiments, the predefined threshold may be a time period in which case the optimal solution 1425 may correspond to the best feasible result generated within that time period. In other embodiments, the predefined threshold may additionally or alternatively be certain computing resources in which case the optimal solution 1425 may be the best feasible solution generated by those computing resources. In other embodiments, other or additional predefined thresholds may be used.

To generate the optimal solution 1425, in some embodiments, the nonquantum computing device 1410 may use a repair heuristic 1430. The nonquantum computing device 1410 may also apply an optimization method 1435 to determine the optimal solution 1425. An example of the optimization method 1435 that the nonquantum computing device 1410 may use is a branch and cut algorithm. In other embodiments, the optimization method 1435 may include a branch and bound algorithm or other linear or non-linear mixed integer optimization programs.

Thus, the hybrid computing system 1400 provides a two-stage linear (non-iterative) approach that solves the optimization program 1415 in entirety (e.g., without dividing the optimization program into sub-problems) in the quantum computing device 1405 to generate the plurality of solutions 1420, which are then taken as starting points in the nonquantum computing device 1410. There are no variational modifications of any parameters between the quantum computing device 1405 and the nonquantum computing device 1410. The hybrid computing system 1400 provides a linear two-stage pathway that executes in a single non-iterative cycle that starts at the quantum computing device 1405 and ends at the nonquantum computing device 1410. In other words, unlike conventional hybrid systems which provide an iterative (e.g., looping) process, the results from the nonquantum computing device 1410 are not looped back into the quantum computing device 1405 for further processing (e.g., parameter or variable variation, combining the sub-results into a final result, etc.).

The optimization program 1415 to be solved by the hybrid computing system 1400 may be any suitable optimization problem or task. For example, in some embodiments, the optimization program 1415 may be a mixed-integer linear program. In some embodiments, the optimization program 1415 may be a mixed-integer non-linear program. In some embodiments, the optimization program 1415 may be a mixed-integer quadratic program. Generally speaking, the optimization program 1415 may be any linear, non-linear, quadratic, convex, nonconvex, constrained, unconstrained, smooth, non-smooth, discrete, combinatorial, or other types of optimization programs that are suitable for being solved by the 2-stage linear quantum/nonquantum hybrid system provided by the hybrid computing system 1400. The optimization program 1415 may be in any suitable application field. For example, the optimization program 1415 may be from fields such as retail, healthcare, power generation, supply chain, drug discovery, artificial intelligence and machine learning, network management, aviation, space exploration, environmental control, etc.

Figure 15:
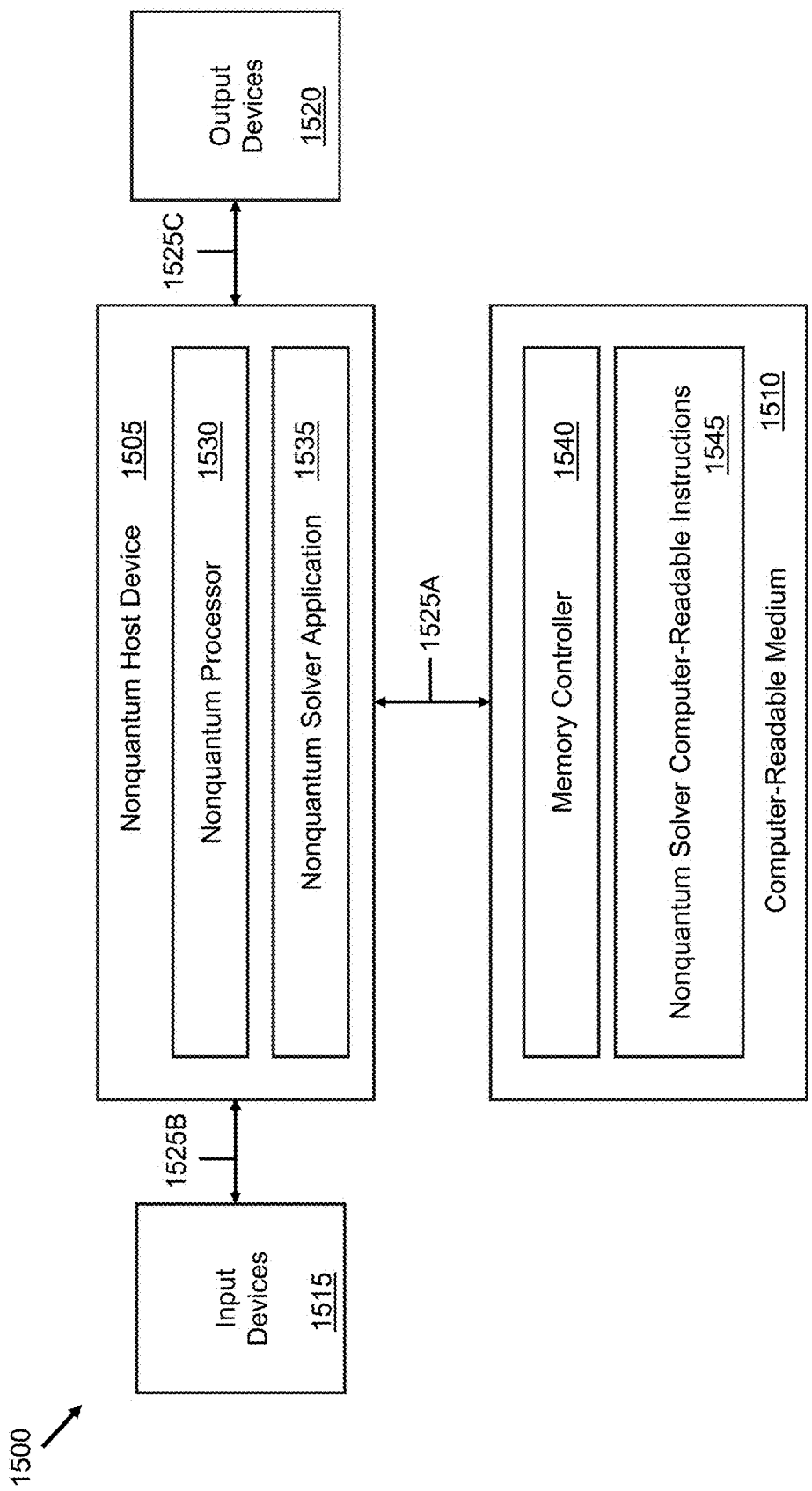
FIG. 15 illustrates a block diagram of an example quantum computing device of FIG. 14, according to embodiments of the present technology.

Referring now to FIG. 15, a block diagram of an example nonquantum computing system 1500 is shown, in accordance with some embodiments of the present disclosure. The nonquantum computing system 1500 may be part of, or otherwise associated with, the computing environment 114. The nonquantum computing system 1500 is an example of the nonquantum computing device 1410. The nonquantum computing system 1500 is a classical or classic computer that is configured for binary computing or binary logic. In other words, the nonquantum computing system 1500 is configured for storing and processing data in binary bits represented logically by either 0 or 1. The classical computer may manipulate these bits through logical operations to perform computations. The classical computer may follow deterministic rules and operate sequentially.

The nonquantum computing system 1500 includes a nonquantum host device 1505 associated with a computer-readable medium 1510. The nonquantum host device 1505 may be configured to receive input from one or more input devices 1515 and provide output to one or more output devices 1520. The nonquantum host device 1505 may be configured to communicate with the computer-readable medium 1510, the input devices 1515, and the output devices 1520 via appropriate communication interfaces, buses, or channels 1525A, 1525B, and 1525C, respectively. The nonquantum computing system 1500 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the nonquantum host device 1505.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the nonquantum computing system 1500) may be implemented by multiple computing devices in a distributed environment, and vice versa.

The input devices 1515 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the nonquantum host device 1505 and that allows an external source, such as a user, to enter information (e.g., data) into the host device and send instructions to the nonquantum host device 1505. Similarly, the output devices 1520 may include a variety of output technologies such as external memories, printers, speakers, displays, microphones, light emitting diodes, headphones, plotters, speech generating devices, video devices, and any other output peripherals that are configured to receive information (e.g., data) from the nonquantum host device 1505. The "data" that is either input into the nonquantum host device 1505 and/or output from the nonquantum host device may include any of a variety of textual data, numerical data, alphanumerical data, graphical data, video data, sound data, position data, combinations thereof, or other types of analog and/or digital data that is suitable for processing using the nonquantum computing system 1500.

The nonquantum host device 1505 may include a nonquantum processor 1430 that may be configured to execute instructions for running one or more applications associated with the nonquantum host device 1505. In some embodiments, the instructions and data needed to run the one or more applications may be stored within the computer-readable medium 1510. The nonquantum host device 1505 may also be configured to store the results of running the one or more applications within the computer-readable medium 1510. One such application on the nonquantum host device 1505 may be a nonquantum solver application 1535. The nonquantum solver application 1535 may be used to solve an optimization program (e.g., the optimization program 1415). The nonquantum solver application 1535 may implement a nonquantum computing solver. An example of the nonquantum computing solver may be a mixed integer linear optimization solver. Another example of the nonquantum computing solver may be a mixed integer non-linear optimization solver. In some embodiments, SAS Viya® provided by SAS Institute Inc. of Cary, North Carolina may be used as the nonquantum computing solver. In other embodiments, other suitable nonquantum computing solvers may be used.

The nonquantum solver application 1535 may be executed by the nonquantum processor 1530. The instructions to execute the nonquantum solver application 1535 may be stored within the computer-readable medium 1510. To facilitate communication between the nonquantum host device 1505 and the computer-readable medium 1510, the computer-readable medium may include or be associated with a memory controller 1540. Although the memory controller 1540 is shown as being part of the computer-readable medium 1510, in some embodiments, the memory controller may instead be part of the nonquantum host device 1505 or another element of the nonquantum computing system 1500 and operatively associated with the computer-readable medium 1510. The memory controller 1540 may be configured as a logical block or circuitry that receives instructions from the nonquantum host device 1505 and performs operations in accordance with those instructions. For example, to execute the nonquantum solver application 1535, the nonquantum host device 1505 may send a request to the memory controller 1540. The memory controller 1540 may read the instructions associated with the nonquantum solver application 1535. For example, the memory controller 1540 may read nonquantum solver computer-readable instructions 1545 stored within the computer-readable medium 1510 and send those instructions back to the nonquantum host device 1505. In some embodiments, those instructions may be temporarily stored within a memory on the nonquantum host device 1505. The nonquantum processor 1530 may then execute those instructions by performing one or more operations called for by those instructions.

The computer-readable medium 1510 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1510. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

It is to be understood that only some components of the nonquantum computing system 1500 are shown and described in FIG. 15. However, the nonquantum computing system 1500 may include other components such as various batteries and power sources, networking interfaces, routers, switches, external memory systems, controllers, etc. Generally speaking, the nonquantum computing system 1500 may include any of a variety of hardware, software, and/or firmware components that are needed or considered desirable in performing the functions described herein. Similarly, the nonquantum host device 1505, the input devices 1515, the output devices 1520, and the computer-readable medium 1510, including the memory controller 1540, may include hardware, software, and/or firmware components that are considered necessary or desirable in performing the functions described herein.

Figure 16:
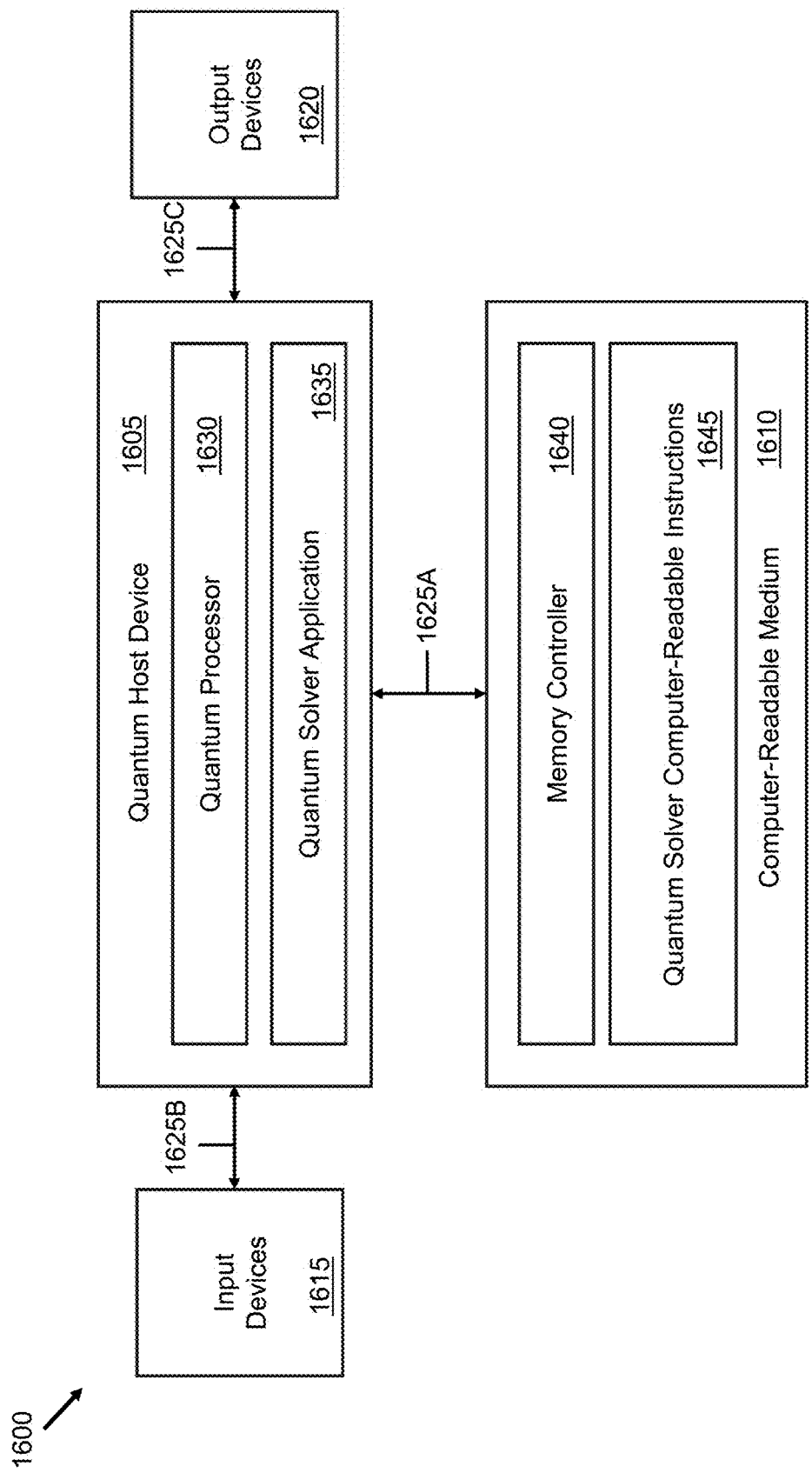
FIG. 16 illustrates a block diagram of an example nonquantum computing device of FIG. 14, according to embodiments of the present technology.

Turning to FIG. 16, a block diagram of an example quantum computing system 1600 is shown, in accordance with some embodiments of the present disclosure. The quantum computing system 1600 may be part of, or otherwise associated with, the computing environment 114. The quantum computing system 1600 is an example of the quantum computing device 1405. The quantum computing system 1600 is a quantum computer that leverages specialized hardware and quantum mechanical phenomenon. Unlike a classical computer that uses bits (0 and 1), a quantum computer uses qubits (quantum bits). These qubits form the basic unit of information in quantum computing. Contrary to a bit, which can only assume two states (0 and 1), a qubit may exist in a superposition of both states simultaneously, meaning that a qubit may assume a state 0, a state 1, and a state 0 and 1 at the same time. Superposition allows quantum computers to explore multiple possibilities at once. In addition to superposition, qubits may be "entangled" meaning that the state of one qubit may instantly impact the state of another qubit to allow parallelism. Quantum computers are also exponentially faster than classical computers, allowing quantum computers to solve large and complex problems significantly faster than classical (e.g., nonquantum) computers.

The quantum computing system 1600 includes a quantum host device 1605 associated with a computer-readable medium 1610. The computer-readable medium 1610 may include one or more memory circuits. The memory circuits of the computer-readable medium 1610 may be similar to the memory circuits of the computer-readable medium 1510. In some embodiments, the quantum computing system 1600 and the nonquantum computing system 1500 may share at least one memory circuit or device. The quantum host device 1605 may be configured to receive input from one or more input devices 1615 and provide output to one or more output devices 1620. The quantum host device 1505 may be configured to communicate with the computer-readable medium 1510, the input devices 1615, and the output devices 1620 via appropriate communication interfaces, buses, or channels 1625A, 1625B, and 1625C, respectively. The input devices 1615 and the output devices 1620 may be similar to the input devices 1515 and the output devices 1520, respectively. In some embodiments, both the quantum computing system 1600 and the nonquantum computing system 1500 may share the same input devices and/or the output devices.

The quantum computing system 1600 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the quantum host device 1605. Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the quantum computing system 1600) may be implemented by multiple computing devices in a distributed environment, and vice versa. Further, the "data" that is either input into the quantum host device 1605 and/or output from the quantum host device may include any of a variety of textual data, numerical data, alphanumerical data, graphical data, video data, sound data, position data, combinations thereof, or other types of analog and/or digital data that is suitable for processing using the quantum computing system 1600.

The quantum host device 1605 may include a quantum processor 1530 that may be configured to execute instructions for running one or more applications associated with the quantum host device 1605. In some embodiments, the instructions and data needed to run the one or more applications may be stored within the computer-readable medium 1610. The quantum host device 1605 may also be configured to store the results of running the one or more applications within the computer-readable medium 1610. One such application on the quantum host device 1605 may be a quantum solver application 1635. The quantum solver application 1635 may be used to solve an optimization program (e.g., the optimization program 1415). The quantum solver application 1635 may be configured to implement a quantum computing solver. In some embodiments, the quantum computing solver may be a quantum annealer.

Quantum Annealing is a specialized form of Adiabatic Quantum Computing which uses the Adiabatic Method in solving the Schrodinger equation. A quantum annealer that implements quantum annealing may be considered a type of a quantum computing solver that is designed for solving optimization programs (e.g., the optimization program 1415). A quantum annealer, unlike a classical computer, does not have logic gates. Instead, the qubits in the quantum annealer are arranged in some kind of arbitrary architecture that tries to maximize the interconnections between qubits. The qubits are not necessarily coupled to match the optimization program, but the optimization program itself maps to the quantum annealer architecture through the use of couplers and Josephson junctions. The architecture of the quantum annealer does not change to match the optimization program. Quantum annealing may express the optimization program to be solved as an objective function. The objective function expresses the optimization program mathematically. The quantum annealer attempts to find a minimum value of the objective function (e.g., a lowest energy state).

In particular, a quantum annealer may be configured to use "quantum fluctuations" where the qubits start in a superposition of all possible solutions and then gradually anneal (e.g., converge) towards a lowest energy state. More particularly, the quantum annealing process starts off by putting all qubits that the optimization program has been mapped to into superposition. The ground state Hamiltonian is mixed with the optimization program Hamiltonian over some period of time, allowing the evolution over this time to solve the mixed Hamiltonian while remaining in the ground state or close to it. The process starts in a ground state and the goal is to remain there. By controlling the "annealing" process, the qubits in a quantum annealer settle to a lowest energy state. Although a quantum annealer is used for the quantum computing solver, in some embodiments, other suitable quantum computing solvers may be implemented in the quantum solver application 1635.

The quantum solver application 1635 may be executed by the quantum processor 1630. The instructions to execute the quantum solver application 1635 may be stored within the computer-readable medium 1610. To facilitate communication between the quantum host device 1605 and the computer-readable medium 1610, the computer-readable medium may include or be associated with a memory controller 1640. Although the memory controller 1640 is shown as being part of the computer-readable medium 1610, in some embodiments, the memory controller may instead be part of the quantum host device 1605 or another element of the quantum computing system 1600 and operatively associated with the computer-readable medium 1610. The memory controller 1640 may receive instructions from the quantum host device 1605 and perform operations in accordance with those instructions. For example, to execute the quantum solver application 1635, the quantum host device 1505 may send a request to the memory controller 1640. The memory controller 1640 may read the instructions associated with the quantum solver application 1635. For example, the memory controller 1640 may read quantum solver computer-readable instructions 1645 stored within the computer-readable medium 1610 and send those instructions back to the quantum host device 1605. In some embodiments, those instructions may be temporarily stored within a memory on the quantum host device 1605. The quantum processor 1630 may then execute those instructions by performing one or more operations called for by those instructions.

The quantum processor 1630 may be any of a variety of quantum processors. For example, in some embodiments, the quantum processor 1630 may be any D-Wave processor, (e.g., D-Wave Advantage, D-wave Advantage2, etc.). In other embodiments, the quantum processor 1630 may be another type of a quantum processor.

It is to be understood that only some components of the quantum computing system 1600 are shown and described in FIG. 15. However, the quantum computing system 1600 may include other components such as various batteries and power sources, networking interfaces, routers, switches, external memory systems, controllers, etc. Generally speaking, the quantum computing system 1600 may include any of a variety of hardware, software, and/or firmware components that are needed or considered desirable in performing the functions described herein. Similarly, the quantum host device 1605, the input devices 1615, the output devices 1620, and the computer-readable medium 1610, including the memory controller 1640, may include hardware, software, and/or firmware components that are considered necessary or desirable in performing the functions described herein.

Figure 17:
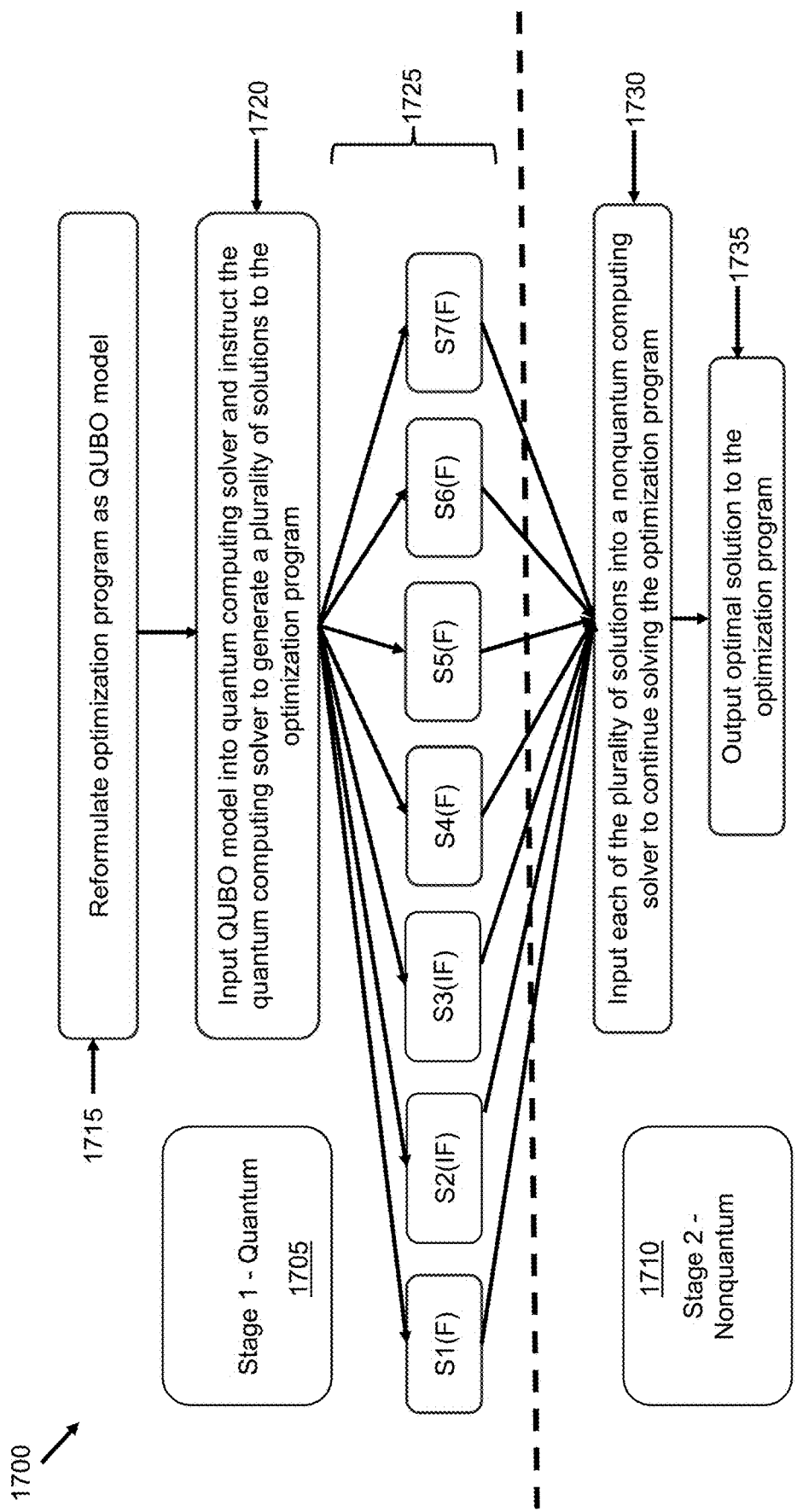
FIG. 17 is a flowchart showing an example process for solving an NP-hard combinatorial optimization program, according to embodiments of the present technology.

Referring to FIG. 17, a flow diagram shows example operations of a process 1700, in accordance with some embodiments of the present disclosure. The process 1700 may include other or additional operations depending on the embodiment. The process 1700 may be executed by a processor. In particular, the processor may execute computer-readable instructions stored on a memory. In some embodiments, the processor executing at least some operations of the process 1700 may be the nonquantum processor 1530. In some embodiments, the processor executing at least some operations of the process 1700 may be the quantum processor 1630. In some embodiments, the processor executing at least some operations of the process 1700 may be another processor that is communicatively associated with the nonquantum processor 1530 and the quantum processor 1630. In some embodiments, multiple processors may execute the process 1700, the multiple processors being one or more of the processors defined above.

The process 1700 may be used to solve the optimization program 1415. The process 1700 includes two stages, a first stage 1705 that is a quantum stage and a second stage 1710 that is a nonquantum or classical stage. The first stage 1705 is executed by the quantum computing device 1405 and the second stage 1710 is executed by the nonquantum computing device 1410. In particular, the first stage 1705 is a quantum stage in which the quantum computing solver of the quantum solver application 1635 generates the set of solutions 1420. The second stage 1710 is a nonquantum stage in which the nonquantum computing solver of the nonquantum solver application 1535 uses the set of solutions 1420 and generates the optimal solution 1425. The optimization program 1415 to be optimized is input into both the first stage 1705 and the second stage 1710. The first stage 1705 and the second stage 1710 provide a 2-stage linear pathway that solves the optimization program 1415 in a single iteration (e.g., without looping back and forth between the quantum and nonquantum computing systems).

In the first stage 1705, the optimization program 1415 is converted into a form that is suitable for processing by a quantum computer (e.g., the quantum computing system 1600). Thus, at operation 1715, the processor reformulates the optimization program 1415 as a Quadratic Unconstrained Binary Optimization (QUBO) model. The operation 1715 is explained in greater detail in FIG. 18. In some embodiments, the optimization program 1415 may be reformulated into the QUBO model in two ways. For example, in some embodiments, the optimization program 1415 may be converted into the QUBO model before inputting the QUBO model into the quantum computing system 1600. In other embodiments, the optimization program 1415 may be input directly into the quantum computing system 1600 and the quantum computing system may generate the QUBO model that is then processed in the quantum computing system.

At operation 1720, which is also part of the first stage 1705, the processor inputs the QUBO model into a quantum computing solver and instructs the quantum computing solver to generate a plurality of solutions to the optimization program 1415 based on the QUBO model generated at the operation 1715. As discussed above, the quantum solver application 1635 may implement a quantum computing solver (e.g., a quantum annealer). The quantum annealer may solve the QUBO model to generate the plurality of solutions (e.g., the set of solutions 1420). The operation 1720 is explained in greater detail in FIG. 19. Thus, at operation 1725, the processor receives the plurality of solutions from the quantum computing solver. Although seven solutions are shown generated in FIG. 17, in other embodiments, any number of solutions may be generated. In real-world applications, typically hundreds or thousands of solutions may be generated. Each of the plurality of solutions may be either a feasible solution or an infeasible solution. For example, as shown in FIG. 17, solutions S1, S4, S5, S6, and S7 are each feasible solutions (indicated by "F" in parenthesis next to the solution) and the solutions S2 and S3 are infeasible solutions (indicated by "IF" in parenthesis next to the solution). Although two infeasible and five feasible solutions are shown in FIG. 17, any number of feasible and/or infeasible solutions may be generated. Further, in some embodiments, either all feasible or all infeasible solutions may be generated as well.

A solution may be considered "feasible" if that solution satisfies all constraints in the objective function of the QUBO model. In other words, a "feasible" solution may be considered a valid solution. A solution may be considered "infeasible" if that solution does not satisfy one or more constraints in the objective function of the QUBO model. As explained in more detail below, when the optimization program 1415 is reformulated as a QUBO model, the optimization program is converted into an objective function having one or more constraints and penalty functions. The optimal solution 1425 of the optimization program 1415 satisfies all the constraints in the objective function. An "infeasible" solution indicates an erroneous or invalid solution. Both feasible and infeasible solutions may be used as starting points for the nonquantum computing system 1500 in the second stage 1710. The plurality of solutions of the operation 1725 may also be saved. The plurality of solutions may or may not correspond to the optimal solution 1425, but due to using quantum computing, may be generated very fast.

Therefore, at operation 1730, which is in the second stage 1710, the processor inputs each of the plurality of solutions from the operation 1725 into a nonquantum computing solver of the nonquantum solver application 1535, which uses each of the plurality of solutions as a starting point to continue solving the optimization program 1415. The operations 1725 and 1730 are discussed in more detail in FIG. 20 below. The nonquantum computing solver of the nonquantum solver application 1535 processes the plurality of solutions to generate the optimal solution 1425 at operation 1735. The processing of the plurality of solutions in the nonquantum computing solver is discussed in more detail in FIGS. 21-22 below.

Figure 18:
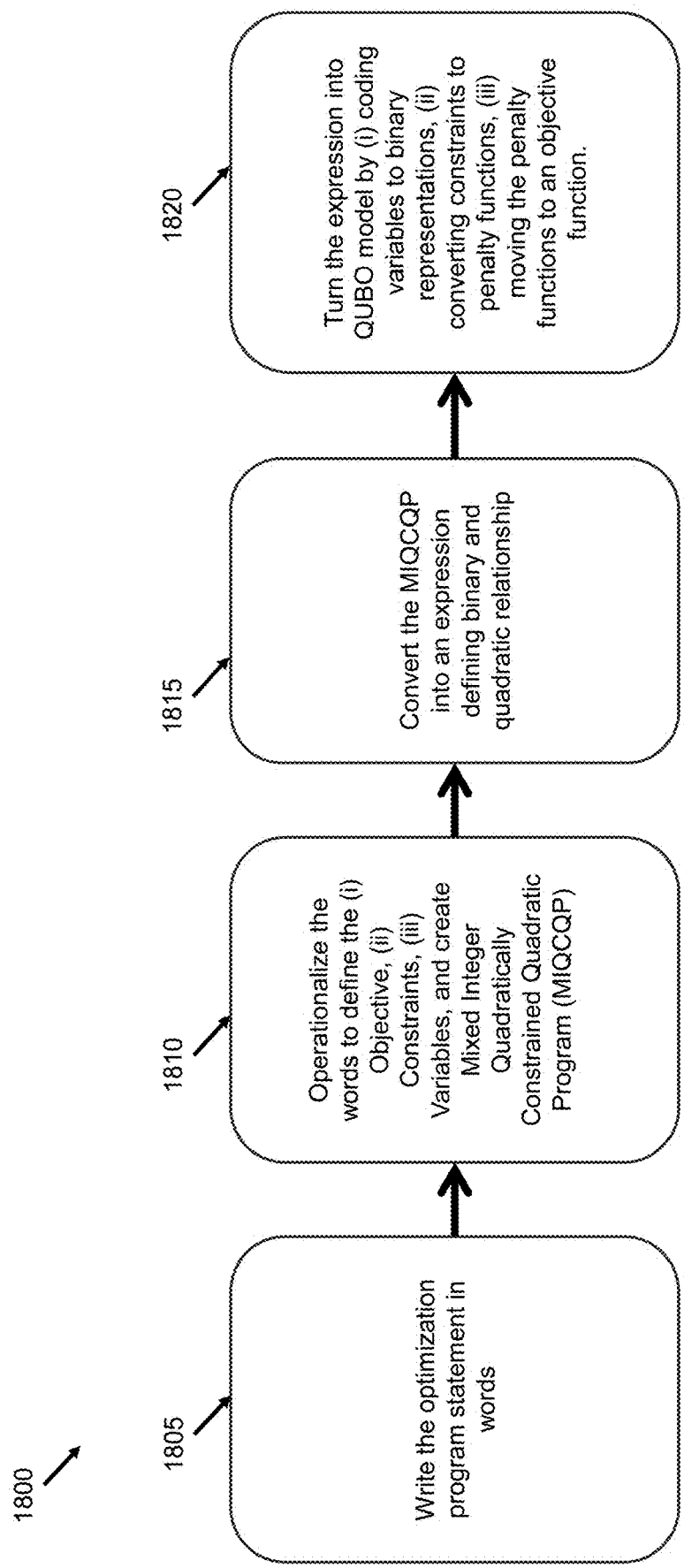
FIG. 18 is an example flowchart showing an operation of the process of FIG. 17 in greater detail, according to embodiments of the present technology.

Referring to FIG. 18, a flow diagram shows example operations of a process 1800, in accordance with some embodiments of the present disclosure. The process 1800 may include other or additional operations depending on the embodiment. The process 1800 explains the operation 1715 in greater detail. Thus, the process 1800 may be used to reformulate the optimization program 1415 into a QUBO model. In particular, at operation 1805, the processor (e.g., the processor of FIG. 17) writes the optimization program 1415 in statement form (e.g., in words). In some embodiments, the processor may receive a statement of the optimization program 1415 from a user. In other embodiments, the processor may present a template to a user to request certain parameters (e.g., variables, constraints, etc.) to generate a statement of the optimization program 1415. In some embodiments, the statement of the optimization program 1415 may be a natural language expression of the problem/task to be optimized. In some embodiments, the natural language expression may identify the target (e.g., objective) to be minimized (or maximized), the variables that may impact the target, any constraints that need to be adhered to when finding the optimal solution 1425, and any other information that may be needed or considered useful to have in expressing the optimization program 1415 in statement form.

As an example, if the optimization program 1415 is to price a product to maximize profit, the objective may be to maximize profit, the constraints may be rules such as limit on the number of pieces of the products that may be manufactured at a given time, an upper and/or lower limit on the price of the product, etc. The variables may be cost of raw materials, cost of manufacturing each piece of the product, sale price of each product, etc. It is to be understood that any example used herein is simply for explanation purposes and not intended to be limiting in any way. In other embodiments, the optimization program 1415 may be written/input into the processor in other formats depending on the program domain.

In some embodiments, the processor may receive additional information related to the optimization program from the user as well. For example, in some embodiments, the processor may receive the constants, coefficients, variables, objective, etc. from the user that may be used to solve the optimization program. In other embodiments, the processor may receive one or more of those values from other sources. Further, in some embodiments, the processor may receive other or additional information from the user or other sources.

At operation 1810, the processor converts the statement form into one or more operations to define the objective, constraints, variables, and create a mixed integer quadratically constrained quadratic program (MIQCQP). As indicated above, an objective of the optimization program 1415 is the target or goal that is desired to be minimized or maximized (e.g., minimize cost, maximize profit, etc.). A constraint is a rule that needs to be followed. In other words, constraints define valid points in a solution space. Therefore, constraints may limit the feasibility region of a solution. Any solution that does not follow all the defined constraints is an infeasible solution. Any solution that follows all defined constraints is a feasible solution. The optimal solution 1425 is typically desired to be selected from a feasible solution. A variable is a characteristic that may be measured or recorded. The objective function and constraints may be associated with one or more variables. In the profit example above, the variables may be cost of raw materials, cost of manufacturing, selling price, etc. At the end of the process 1800, the optimization program 1415 may be defined in terms of an objective function that combines the variables and constraints.

In some embodiments, the processor may parse the statement form of the optimization program 1415. In some embodiments, the processor may present one or more user interfaces, drop-down lists, or other input interfaces to receive values for the variables, objective, constraints, coefficients, etc. In other embodiments, the processor may use other mechanisms to define the variables, constraints, objective, coefficients, etc. Responsive to defining the variables, constraints, and objective, the processor may convert those variables, constraints, and objective into MIQCQP. Generally speaking, a mixed-integer optimization program may include both integer and continuous variables. MIQCQP combines integer variables, quadratic constraints, and a quadratic objective function. To solve an optimization program using optimization, the optimization program needs to put into a format that a quantum computing solver is able to understand. MIQCQP is a mechanism by which the optimization program may be converted into a format that the quantum computing solver is able to understand. The "MI" part of "MIQCQP" stands for mixed-integer, which allows both integer and non-integer (continuous) variables, the "QC" part stands for quadratically constrained as constraints may be linear or quadratic, and the "QP" part stands for quadratic program, as the objective function may be linear or quadratic.

To convert the optimization program into MIQCQP, broadly speaking, any decisions may be translated into variables that the quantum computing solver may control/change, any restrictions (e.g., production cost to be kept below a certain amount, etc.) may be translated into constraints (which may be physical restrictions, resource-based, etc.), and the features of the optimization program to be optimized are translated into the objective function. In some embodiments, the objective function may be defined as follows:

$$\min_x (x^T Q x + q^T x) \quad \text{Equation 1}$$

In Equation 1 above, the objective function is a minimization function. A maximization function may be similarly defined. Further, in Equation 1 above, x is a vector of variables, Q is a symmetric matrix of quadratic coefficients, and q is a vector of linear coefficients. Additionally, in some embodiments, for MIQCQP, each constraint may be a quadratic constraint that may be defined as follows:

$$x^T Q_i x + q_i^T x \leq b_i \quad \text{Equation 2}$$

In Equation 2 above, $Q_i$ is a symmetric matrix for the i-th constraint, $q_i$ is a vector of linear coefficients for the i-th constraint, bi is a constant for the i-th constraint, and T is a transpose vector (e.g., an N-by-1 vector converted into a 1-by-N vector) to facilitate element-wise multiplicaiton.

Additional details of MIQCQP may be found in *Misener, Ruth, and Christodoulos A. Floudas,* "Global optimization of mixed-integer quadratically-constrained quadratic programs (MIQCQP) through piecewise-linear and edge-concave relaxations." *Mathematical Programming* 136.1 (2012): 155-182, the entirety of which is incorporated by reference herein. Although MIQCQP is used at the operation 1810, in other embodiments, other mixed integer techniques such as mixed integer quadratically constrained program (MIQCP) or other techniques may be used to combine the variables, constraints, and the objective.

At operation 1815, the processor converts the MIQCQP of the operation 1810 into the QUBO model. In some embodiments, the processor converts the expression into the QUBO model by coding variables to binary representations, converting constraints to penalty functions, and moving the penalty functions to the objective function. Because the QUBO model by nature is an "unconstrained" model, constraints may technically not be defined in the QUBO model. Thus, in some embodiments, the constraints may be defined in terms of "penalty" functions (e.g., penalty functions may replace constraints) to create an unconstrained objective function. A "penalty" may be added when a constraint is violated. In some embodiments, the penalty may be desired to be minimized.

In some embodiments, the QUBO model may be defined as follows:

$$f(x) = \Sigma_i Q_{i,i} X_i + \Sigma_{i<j} Q_{i,j} X_i X_j \quad \text{Equation 3}$$

In Equation 3 above, $f(x)$ is the objective function, Q is a square (e.g., symmetric) matrix having n rows and n columns, i is a row and j is a column of Q, X is a vector of binary variables, $Q_{i,i}$ are linear coefficients, and $Q_{i,j}$ are quadratic coefficients. Thus, the processor reformulates the optimization program 1415 as the QUBO model using the process 1800 by defining an objective function for the optimization program.

Figure 19:
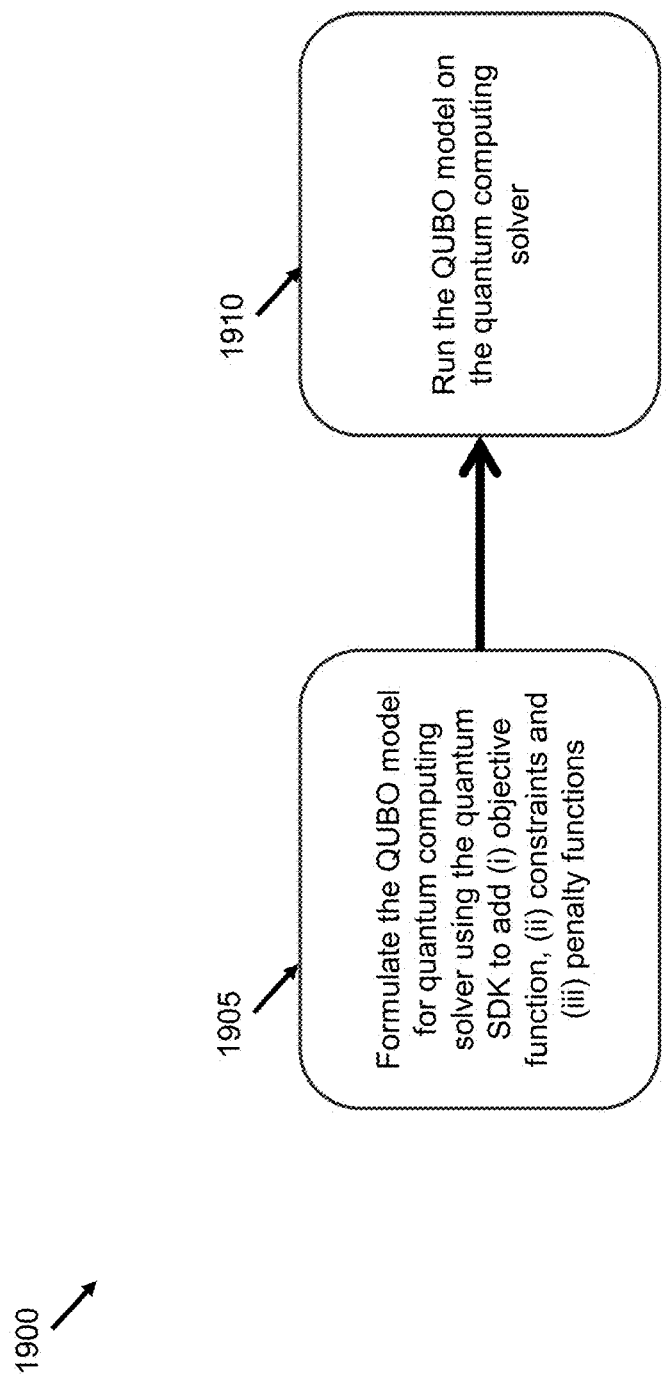
FIG. 19 is an example flowchart showing an operation of the process of FIG. 17 in greater detail, according to embodiments of the present technology.

Turning now to FIG. 19, a flow diagram shows example operations of a process 1900, in accordance with some embodiments of the present disclosure. The process 1900 may include other or additional operations depending on the embodiment. The process 1900 explains the operation 1720 in greater detail. Thus, the process 1900 may be used to input the QUBO model defined using the process 1800 into the quantum computing solver and instructing the quantum computing solver to optimize the optimization program 1415. In particular, at operation 1905, the processor (e.g., the processor of FIG. 17) adds the objective function, constraints, and the penalty functions to a software development kit (SDK) associated with the quantum computing solver. The SDK associated with the quantum computing solver may be a software tool kit for developing quantum algorithms. In some embodiments, the SDK may be associated with a single quantum computing solver. In other embodiments, the SDK may be associated with multiple quantum computing solvers, and the user may define which quantum computing solver to use (or a quantum computing solver may be designated as default). The SDK allows the quantum computing solver to solve the optimization program 1415 by using a quantum computer (e.g., the quantum computing system 1600). Any suitable SDK may be used. For example, in some embodiments, the Ocean™ SDK from the D-Wave™ suite may be used. In other embodiments, other suitable quantum SDKs may be used.

In some embodiments, the SDK may be associated with one or more quantum computing solvers that receive the QUBO model and return the set of solutions 1420. In some embodiments, the SDK may include an Application Programming Interface (API) that forms an abstraction layer and facilitates communication with the quantum computing solver. In some embodiments and as discussed above, the optimization program 1415 may be converted into the QUBO model by the quantum computing system 1600. In such cases, the SDK may include interfaces that may define the optimization program 1415 as a QUBO model. For example, in some embodiments, the optimization program 1415 including the objective, variables, and constraints may be input (e.g., via the API) into the SDK. The SDK may include mapping tools that may translate the objective, constraints, and variables into the QUBO model and then provide the QUBO model to the quantum computing solver.

Thus, in some embodiments, the optimization program 1415 may be input into the SDK and the SDK may generate the QUBO model from the optimization program, while in other embodiments, the QUBO model may be input into the SDK. Regardless of how the QUBO model is created, the processor, via the SDK, runs the QUBO model on the quantum computing solver at operation 1910. In some embodiments, running the QUBO model on the quantum computing solver may include the SDK assigning certain computing resources to the quantum computing solver and running the QUBO model in parallel in multiple process threads to generate the set of solutions 1420 very fast.

Figure 20:
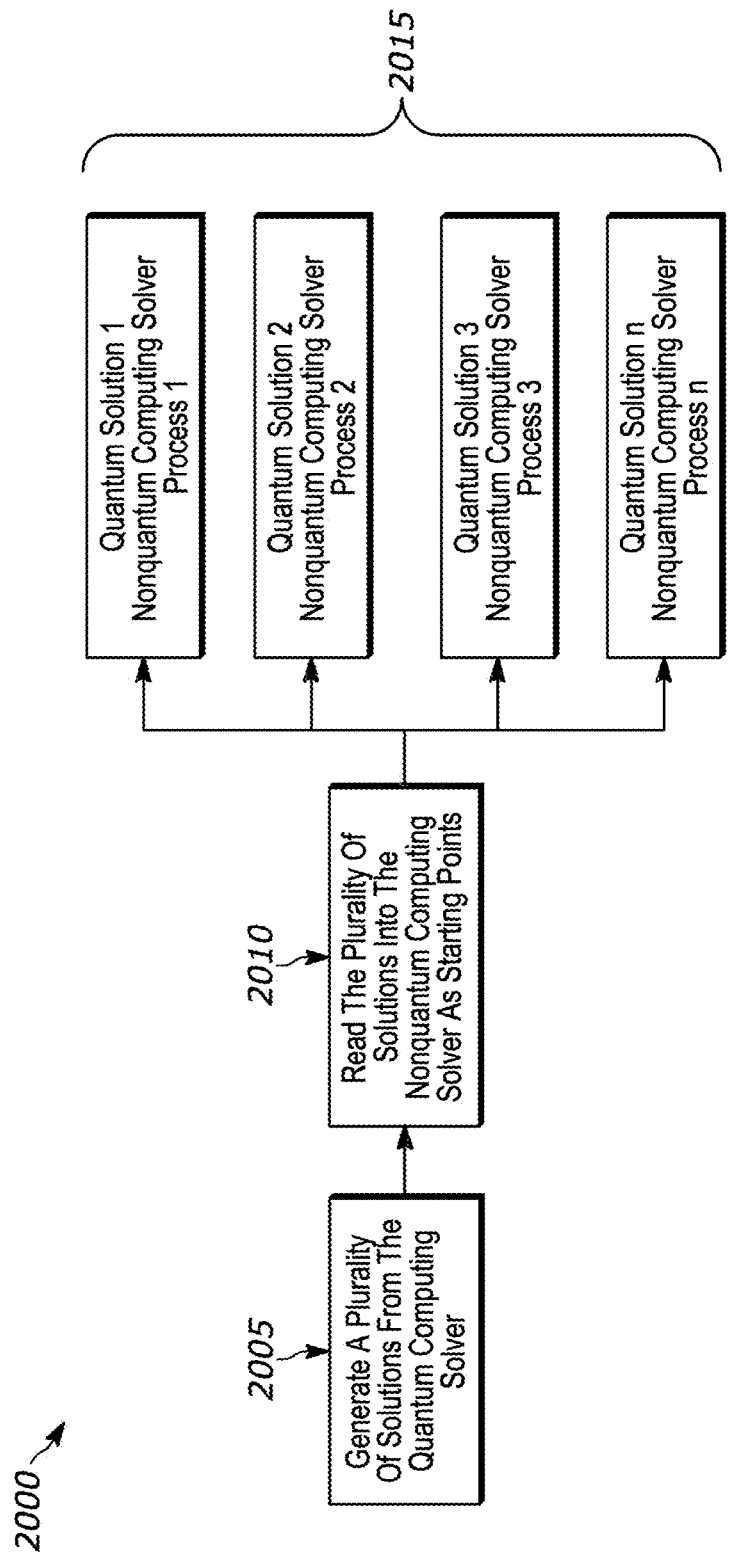
FIG. 20 is an example flowchart showing an operation of the process of FIG. 17 in greater detail, according to embodiments of the present technology.

Referring now to FIG. 20, a flow diagram shows example operations of a process 2000, in accordance with some embodiments of the present disclosure. The process 2000 may include other or additional operations depending on the embodiment. The process 2000 explains the operations 1725 and 1730 in greater detail. Thus, the process 2000 may be used to generate the set of solutions 1420 from the process 1900 and then input the set of solutions to the nonquantum computing solver. In particular, at operation 2005, the processor (e.g., the processor of FIG. 17) receives a plurality of results (e.g., the set of solutions 1420) from the nonquantum computing solver as a result of running the QUBO model on the quantum computing solver in the process 1900. The processor may save the plurality of solutions. Each solution of the plurality of solutions may be a feasible solution or an infeasible solution. The feasibility or infeasibility of the solution may be indicated by a feasibility flag. In some embodiments, the feasibility flag may be a one-bit value where one value (e.g., 0) indicates an infeasible solution and the other value (e.g., 1) indicates a feasible solution. In other embodiments, the feasibility flag may assume other configurations.

The feasibility flag may be returned along with the plurality of solutions. In particular, each solution of the plurality of solutions that is generated from the nonquantum computing solver may have certain values associated therewith. These values may include the feasibility flag, a variable name for each variable in the QUBO model, a variable value for each variable name, an energy value associated with the objective function, a frequency value, a constraint list, and a solution number. In some embodiments, each solution may be consecutively given a solution number. Each solution may include other or additional types of information associated therewith. When saving a solution, the processor may also save the corresponding values of the feasibility flag, variable name, variable value for each variable name, energy value associated with the objective function, the frequency value, the constraint list, and the solution number for each solution. Each solution may be associated with one value of the objective function (e.g., indicated by the energy value). Thus, the plurality of solutions may be associated with a plurality of objective function values.

The processor reads or inputs each of the plurality of solutions into the nonquantum computing solver at operation 2010. In some embodiments, the processor may also input one or more of the feasibility flag, variable name, variable value for each variable name, energy value associated with the objective function, the frequency value, the constraint list, and the solution number for each solution into the nonquantum computing solver. The nonquantum computing solver uses the plurality of solutions as a starting point. The nonquantum computing solver executes each of the plurality of solutions in parallel to generate the optimal solution 1425, at operation 2015. For example, in some embodiments and as shown in FIG. 20, the nonquantum computing solver may execute quantum solution 1 (e.g., the first solution of the plurality of solutions generated from the quantum computing solver) in a first process, quantum solution 2 in a second process, and so on, to obtain the optimal solution 1425. In some embodiments, the nonquantum computing solver may execute the various solutions from the quantum computing solver serially to obtain the optimal solution 1425.

Figure 21:
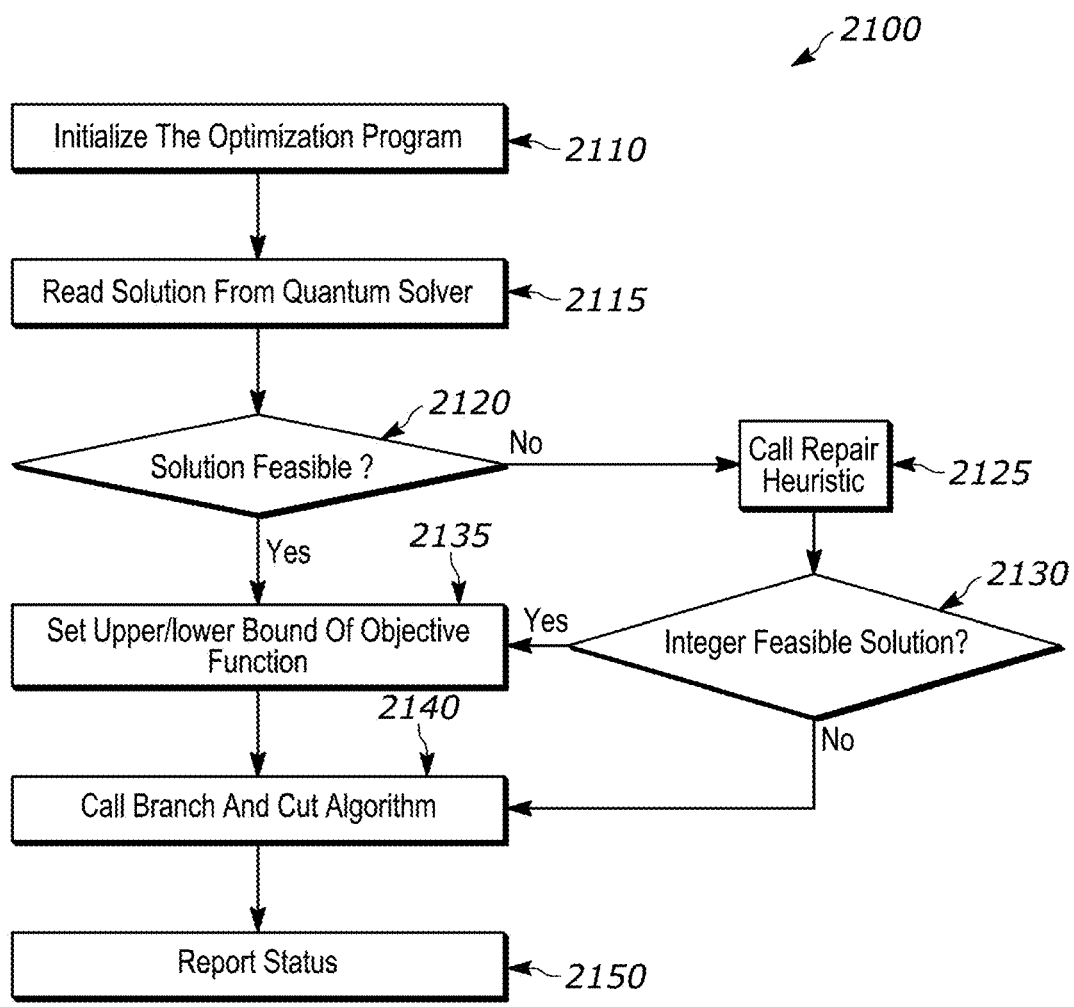
FIG. 21 is an example flowchart showing an operation of the process of FIG. 17 in greater detail, according to embodiments of the present technology.

Referring now to FIG. 21, a flow diagram shows example operations of a process 2100, in accordance with some embodiments of the present disclosure. The process 2100 may include other or additional operations depending on the embodiment. The process 2100 explains the operation 1735 in greater detail. In particular, the process 2100 may be used for both a "warm start" or a "cold start" execution of a solution in the nonquantum computing solver.

An execution of a solution may be considered a warm start when the nonquantum computing solver has some information available about the optimization program 1415 from the solution. Specifically, as discussed above, the quantum computing solver generates a plurality of solutions (e.g., the set of solutions 1420) and each solution may be either feasible or infeasible. Each feasible solution indicates that all constraints are satisfies and each infeasible solution indicates that at least one constraint is violated. Because the nonquantum computing solver is using these feasible and infeasible solutions as a starting point, any result generated from an infeasible solution may also be infeasible, and therefore invalid. A result generated from executing a feasible solution may end up being feasible or infeasible. When the nonquantum computing solver uses a feasible solution as a starting point, that execution is referred to as a warm start. This is because the nonquantum computing solver already has some valid information about that solution (e.g., that the solution satisfies all the constraints) that the nonquantum computing solver may be able to leverage to continue executing that solution without needing to solve the optimization program 1415 from scratch. The nonquantum computing solver may be able to determine whether a solution is feasible or not by reviewing the feasibility flag of that solution. Thus, if the quantum computing solver generates a feasible solution, and the feasibility flag indicates as such, the nonquantum computing solver assumes that the solution is feasible and continues solving that solution in a warm start execution.

On the other hand, if the nonquantum computing solver determines that a solution generated from the quantum computing solver is an infeasible solution (e.g., from the feasibility flag of that solution), the nonquantum computing solver knows that the solution does not satisfy all the constraints and therefore cannot rely on that solution as a valid starting point. In such cases, the nonquantum computing solver may ignore or discard that infeasible solution and execute the optimization program 1415 from scratch. Such an execution from scratch is a cold start execution because the nonquantum computing solver has no valid previous information about the solution.

The process 2100 is executed for each solution that is either a warm start execution or a cold start execution. In other words, the process 2100 is executed for each solution whose feasibility flag indicates a feasible solution or an infeasible solution. At operation 2110, the processor (e.g., the processor of FIG. 17) initializes the optimization program 1415. As indicated above, the optimization program 1415 is also input into the nonquantum computing solver. The nonquantum computing solver initializes the optimization program 1415 to be able to solve that optimization problem to the optimal solution 1425. Initializing the optimization program 1415 may include defining the optimization program in terms of the objective function and defining the variables and constraints. The nonquantum computing solver may convert the optimization program 1415 into an initial representation of matrices and vectors that represent the objective function, variables, and constraints (and/or penalty functions). The nonquantum computing solver may perform other operations to initialize the optimization program 1415.

At operation 2115, the processor reads a solution of the plurality of solutions (e.g., the set of solutions 1420) generated from the quantum computing solver. Reading the solution may indicate identifying values for one or more of the feasibility flag, variable name, variable value for each variable name, energy value associated with the objective function, the frequency value, the constraint list, and the solution number for each solution. At operation 2120, the processor determines if the solution read at the operation 2115 is a feasible solution. The processor may read the value of the feasibility flag for the solution and determine the feasibility or infeasibility of the solution. If the processor determines that the solution is an infeasible solution, the processor is configured to run a repair heuristic (e.g., the repair heuristic 1430) on the solution to attempt to convert the infeasible solution into a feasible solution to obtain a converted feasible solution at operation 2125. The repair heuristic may attempt to adjust the variables such that all constraints are satisfied. Any suitable repair heuristic may be used. For example, in some embodiments, a repair heuristic provided by SAS Institute Inc. of Cary, North Carolina may be used. In other embodiments, other repair heuristics may be used. An example of a repair heuristic may be found in Glover, Fred, "Heuristics for integer programming using surrogate constraints." Decision Sciences 8.1 (1977): 156-166, the entirety of which is incorporated by reference herein.

At operation 2130, the processor analyzes the result of the repair heuristic and determines if the solution resulting from the repair heuristic is an integer feasible solution. In linear programming (and in integer linear programming), an integer feasible solution is a solution in which all variables assume integer values while satisfying all the constraints. If any variable in the solution resulting from the repair heuristic is not an integer value, the processor determines that the solution resulting from the repair heuristic is not an integer feasible solution, and therefore, an infeasible solution that cannot be repaired at the operation 2125. Thus, if the processor determines that the solution resulting from the repair heuristic is an integer feasible solution, it means that the infeasible solution read at the operation 2115 has been converted into a feasible solution (e.g., converted feasible solution) and the process 2100 proceeds to operation 2135. On the other hand, if the processor determines at the operation 2130 that the solution resulting from the repair heuristic is not an integer feasible solution, the solution is an infeasible solution that needs to be processed in a cold start execution and the process 2100 proceeds to operation 2140. As indicated above, for a cold start execution, the processor discards or ignores the solution of the operation 2115 and uses the initialization of the optimization program 1415 from the operation 2110 as a starting point.

At the operation 2135, which is reached from either the operation 2130 or the operation 2120, the processor sets an upper or lower bound of the objective function. An upper bound of the objective function may indicate a highest value that the objective function may achieve to provide the optimal solution 1425. The upper bound indicates that if the objective function has a value greater than the upper bound, the corresponding solution cannot be an optimal solution. The lower bound of the objective function may indicate a lowest value that the objective function may achieve to provide the optimal solution 1425. The lower bound indicates that if the objective function has a value less than the lower bound, the corresponding solution cannot be an optimal solution. In some embodiments, the processor may set both an upper bound and a lower bound. In some embodiments, the processor may receive the upper bound and/or lower bound values from a user. In other embodiments, the processor may set default or preprogrammed upper and/or lower bound values. The objective function for which the upper bound or lower bound values are set may be the objective function defined in the QUBO model.

Referring still to FIG. 21, at the operation 2140, which is reached either from operation 2135 or from the operation 2130, the processor executes a branch and cut algorithm. If the operation 2140 is reached from the operation 2135, the objective function used for the branch and cut algorithm is the objective function defined by the QUBO model. If the operation 2140 is reached from the operation 2130 (indicating an infeasible solution) indicating a cold start, the objective function used for the branch and cut algorithm is the objective function defined at the operation 2110.

As indicated above, the process 2100 may be repeated for each solution from the quantum computing solver. Thus, the branch and cut algorithm may be executed for each solution, generating potentially a plurality of outputs. Because the quantum computing solver is exact, even though each solution goes separately through the branch and cut algorithm, in some embodiments, a single unique output corresponding to the optimal solution may be generated. In other words, the same optimal solution may be generated from each iteration of the branch and cut algorithm execution. In some embodiments, after the first optimal solution is generated by the branch and cut algorithm, in some embodiments, the process 2100 may be stopped. In other words, the remaining solutions need not execute the process 2100 because they are likely to generate the same optimal solution. In other embodiments, all solutions generated from the quantum computing solver may be put through the process 2100 to potentially generate a plurality of optimal solutions, which may then be further analyzed to generate one unique optimal solution.

The branch and cut algorithm may be used to solve/optimize a mixed-integer linear or non-linear program. In other embodiments, other optimization methods (e.g., the optimization method 1435) may be used instead of or in addition to the branch and cut algorithm. The branch and cut algorithm is discussed in more detail in FIG. 22 below.

The branch and cut algorithm may be executed until a stopping criterion is reached. The stopping criterion, in some embodiments, may be a defined period of time. When the defined period of time expires, the result of the branch and cut algorithm is output. Other or additional stopping criterion may be used in other embodiments. When the stopping criterion is reached, at operation 2150 the processor outputs the result of the branch and cut algorithm and reports a status indicating the state of the result. In some embodiments, the status may be an optimal status indicating that the result of the branch and cut algorithm is an optimal result (e.g., the optimal result 1425). In some embodiments, the status may be a feasible status indicating that the result of the branch and cut algorithm is not an optimal solution but still a feasible solution. In some embodiments, a feasible (but non-optimal) solution may be output from the branch and cut algorithm when the stopping criterion is reached before the branch and cut algorithm has had a chance to process all the solutions. In such a case, the feasible solution may be considered as the optimal solution (e.g., the optimal solution 1425) or the stopping criterion may be changed to allow the branch and cut algorithm to complete execution. In some embodiments, the result of the result of the branch and cut algorithm may be an infeasible solution indicating that no feasible (or optimal) solutions were found. In some embodiments, an infeasible solution may be output from the branch and cut algorithm when the stopping criterion is reached before the branch and cut algorithm has had a chance to process all the solutions and all the processed solutions so far have been infeasible. In such a case, the stopping criterion may be changed to allow the branch and cut algorithm to complete execution to determine if any feasible or optimal solutions are generated. In some embodiments, an infeasible solution may be reported if the objective function includes contradictory constraints, only one of which may be satisfied.

Figure 22:
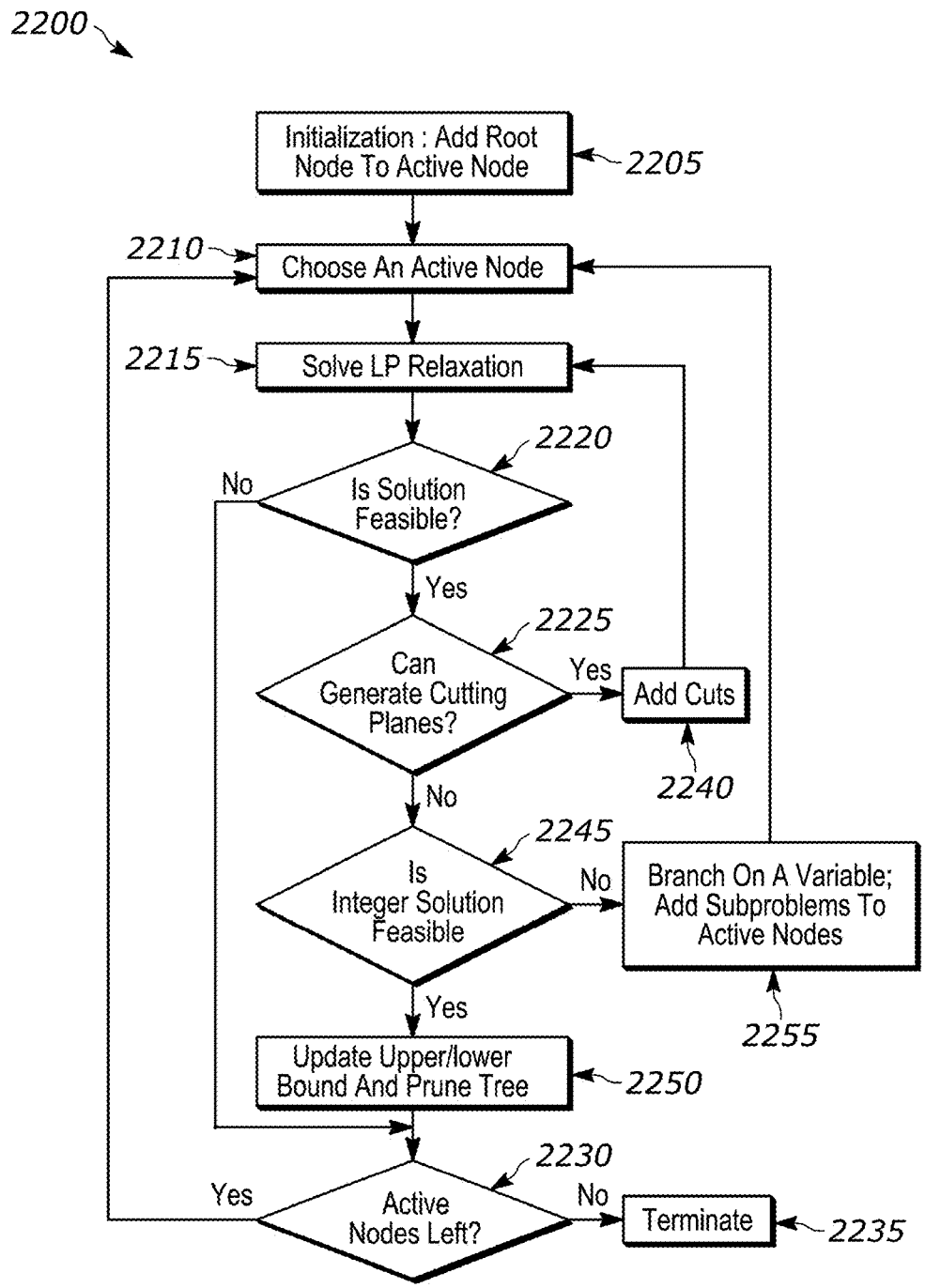
FIG. 22 is an example flowchart showing an operation of the processes of FIG. 21 in greater detail, according to embodiments of the present technology.

Referring to FIG. 22, a flow diagram shows example operations of a process 2200, in accordance with some embodiments of the present disclosure. The process 2200 may include other or additional operations depending on the embodiment. The process 2200 explains the operations 2140 and 2160 in greater detail. Thus, the process 2200 outlines the operations performed in the branch and cut algorithm. As indicated above, the branch and cut algorithm may be used to optimize integer linear or non-linear programming problems. The branch and cut algorithm is a tree search algorithm having a plurality of nodes, each node representing a subproblem. A subproblem may be a value of an objective function. The nodes, therefore, may form a tree of subproblems. Each node or subproblem may represent a linear programming or quadratic programming subproblem. One node may be processed at a time. Nodes that have not yet been processed are considered "active" nodes. When a node has been processed, it may be considered an "inactive" node. The branch and cut algorithm may begin processing with a "root" node. This root node may represent the entire optimization program 1415 (e.g., the algorithm may begin with the value of the objective function defined in the previous operations). When the branch and cut algorithm is first started, there is only the root node. The root node is the active node. When the root node is processed and subproblem nodes are added (e.g., with updated objective function values), there may be other active nodes in the tree.

The branch and cut algorithm may be defined by three main features: (1) branch and bound; (2) cutting planes; and (3) linear programming (LP) relaxation. Branch and bound explores the solution space while branching into smaller subproblems. The algorithm keeps track of the best solution generated so far and discards the solutions that are worse than the best solution generated at that point. Thus, the branch and bound expands by adding subproblem nodes and prunes by removing nodes that are worse than the best solution at that point simultaneously. LP relaxation arises when the integrality constraint is removed from each variable in an integer linear program (ILP). In an ILP, variables and constraints are required to take integer values. To generate an LP relaxation, the variables and constraints of the objective function are allowed to have continuous values (e.g., non-integer values). Creating an LP relaxation may transform an NP (non-polynomial) hard optimization ILP into a problem solvable in polynomial time. Thus, LP relaxation removes the constraint that all variables and constraints need to have integer values. Cutting planes assist with updating the upper or lower bounds of the objective function. In other words, the cutting planes may help with finding the best solution in an iteration. The results from the cutting plane may be used to update the best solution (e.g., update the upper or lower bounds of the objective function). Cutting planes may add additional constraints to make the best solution (e.g., the upper bound or the lower bound of the objective function) more precise. These additional constraints may improve the upper or lower bound by ruling out or cutting fractional solutions.

Thus, at operation 2205, the processor initializes the tree of the branch and cut algorithm by adding a root node (e.g., objective function value) to an active node. At operation 2210, the processor selects one active node. At the beginning of the algorithm, the root node is the only active node. In that case, the root node may be selected as the active node. As the algorithm progresses and additional nodes are added, there may be multiple active nodes and one of those active nodes may be selected at the operation 2210. Any suitable criterion may be used to select the next active node.

At operation 2215, the LP relaxation is created for the selected active node. In other words and as explained above, the constraint of integrality from the variables and constraints of the objective function is removed. The objective function with the integrality removed may then be solved by the nonquantum computing solver to generate a solution. At operation 2220, the processor determines if that solution generated after LP relaxation is a feasible or an infeasible solution. The processor may determine that the solution is a feasible solution if that solution satisfies all constraints and the processor may determine that the solution is an infeasible solution if that solution violates at least one constraint of the objective function with the integrality removed. For a feasible solution, the process 2200 proceeds to operation 2225 and for an infeasible solution, the process 2200 proceeds to operation 2230.

At the operation 2230, since the solution is infeasible, the processor may prune the current active node from the tree and determine if there are any additional active nodes left. If there are other active nodes remaining in the tree, the process 2200 loops back to the operation 2210 to select another active node. If there are no active nodes left in the tree at the operation 2230 (or the stopping criterion has reached), the process 2200 terminates at operation 2235 and the result from the process 2200 is reported at the operations 2150 and 2165.

At the operation 2225, the processor determines if any cutting planes may be generated to bring the final solution from the branch and cut algorithm closer to an integer solution. In other words, the processor determines if that solution generated from LP relaxation at the operation 2215 has any non-integer values and whether additional constraints may be added to remove those non-integer values. If the processor determines that there is at least one non-integer value that may be removed, the processor adds a cutting plane at operation 2240 and loops back to the operation 2215 where the LP relaxation is again created and the resulting objective function is solved by the nonquantum computing solver. In some embodiments, the process of cutting planes continues until all non-integer values have been removed. In other embodiments, the process of cutting planes may continue until a predefined criterion is reached. For example, in some embodiments, the number of cutting planes (e.g., 10) to be generated may be predefined. Once the number of defined cutting planes is reached, the process of cutting planes may stop. In other embodiments, other criterion may be used for cutting planes. If no additional cutting planes may be generated at the operation 2225, the process 200 proceeds to operation 2245 where the solution generated after the operation 2215 is checked for integer feasibility.

Thus, at the operation 2245, the processor determines if the solution generated after cutting all planes is an integer feasible solution or not. If the processor determines that the solution is an integer feasible solution, the processor updates the upper and/or lower bound of the objective function at operation 2250. Specifically, the processor may replace any previously set upper or lower bounds of the objective function with the upper or lower bounds of the objective function associated with the integer feasible solution of the operation 2245. Further, at the operation 2250, any active nodes of the tree whose objective function values are worse than the updated upper or lower bound set at the operation 2250 may be pruned (because those cannot generate a better result).

On the other hand, if at the operation 2245 the processor determines that the solution generated after the operation 2215 is not an integer feasible solution, the process 200 proceeds to operation 2255 where the tree is expanded by adding one or more new active nodes (e.g., two nodes), with each node having a different subproblem (e.g., value of the objective function) that is determined based on the current active node. For example, if the solution has a value of 3.5, in some embodiments, the processor may add two child nodes of the current active node, with one node having a value of less than 3 and another node having a value greater than 4. Responsive to generating the new nodes, the process 2200 loops back to the operation 2210 to select a new or next active node (which may or may not be the added child nodes).

Figure 23:
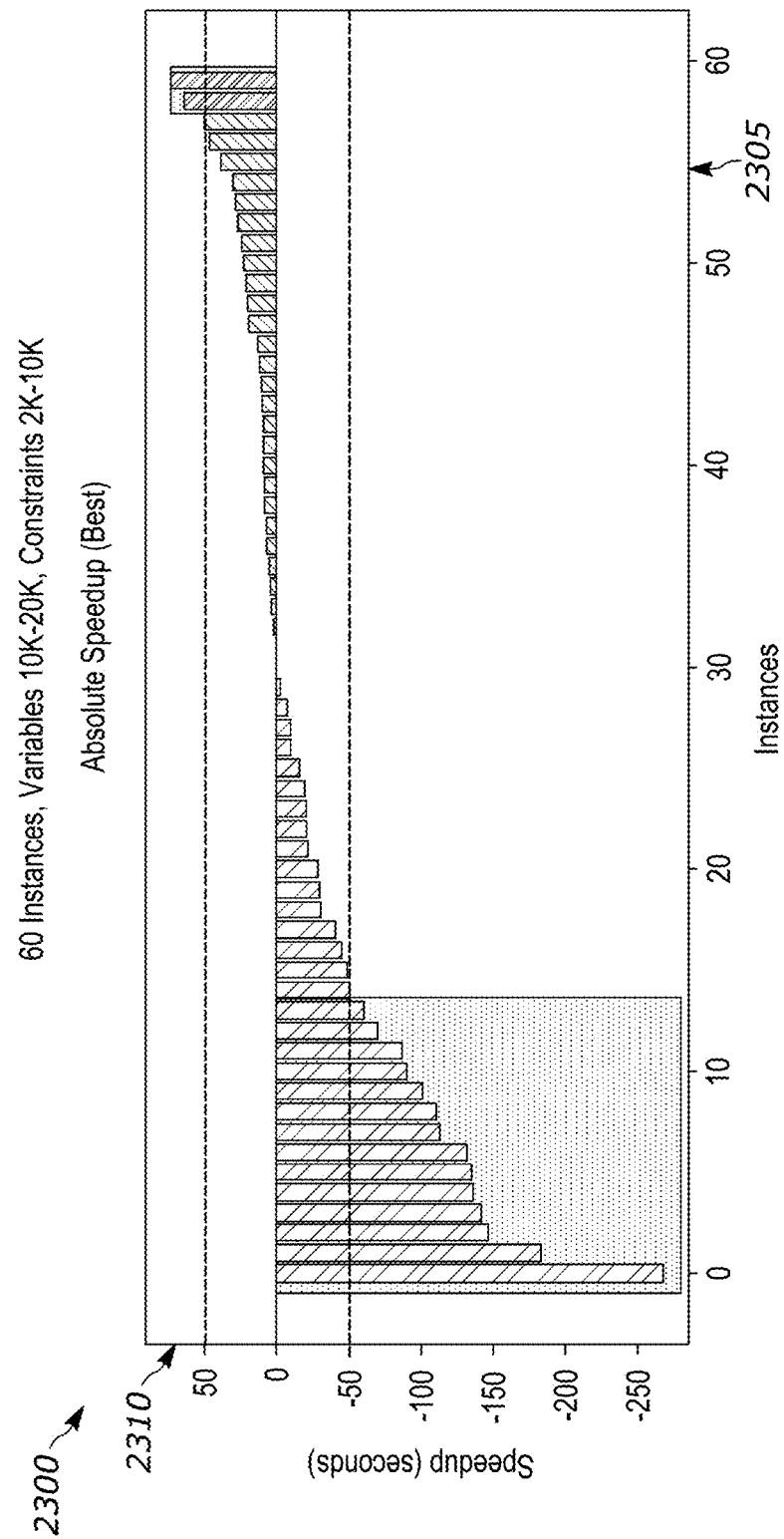
FIG. 23 is an example graph comparing a difference in speedup between the proposed hybrid quantum/nonquantum computing system and a conventional nonquantum computing device, according to embodiments of the present technology.

Turning now to FIG. 23, an example graph 2300 comparing a difference in speedup between the proposed hybrid quantum/nonquantum computing system and a conventional nonquantum (e.g., classical) computing device is shown, in accordance with some embodiments of the present disclosure. The graph 2300 plots instances of an optimization program on X-axis 2305 against speedup on Y-axis 2310. The inventors generated 60 different instances of the same optimization program 1415. Each instance included randomly generated data. Each instance included anywhere from 10,000 to 20,000 variables and anywhere from 2000 to 10,000 constraints. Each instance is plotted on the X-axis 2305. Inventors executed each of these instances on a nonquantum computing solver entirely and found that it was challenging for the nonquantum computing solver to solve these instances. Inventors also executed each of these instances on the proposed hybrid quantum/nonquantum computing system. Speedup is the absolute speedup achieved. Speedup may be time taken to generate an optimal solution for the particular instance. The graph 2300 compares the speedup achieved in each instance using the proposed approach relative to solving that instance in cold start using a nonquantum computing solver.

The bars with negative numbers on the Y-axis 2310 represent a speedup achieved in each instance using the proposed approach relative to solving the instance on a nonquantum computing solver alone. The bars with the positive numbers on the Y-axis 2310 indicate the instances where solving a particular instance using the nonquantum computing solver alone was faster than using the proposed approach. As seen from the graph 2300, in over 50% of the instances, the proposed approach outperformed the nonquantum computing solver. In most of the instances where the nonquantum computing solver outperformed the proposed approach, the absolute speedup was only a few seconds. Inventors found that the instances in which the nonquantum computing solver outperformed the proposed approach were those instances where the number of variables and constraints were relatively smaller. In such cases the extra few seconds that the proposed approach took were due to initializing the quantum computing solver. This suggests that the proposed approach is particularly beneficial in cases where the optimization program has a large number of variables and constraints and in those cases where the number of variables and constraints are somewhat smaller, the proposed approach is almost as good as the nonquantum computing solver approach.

Figure 24:
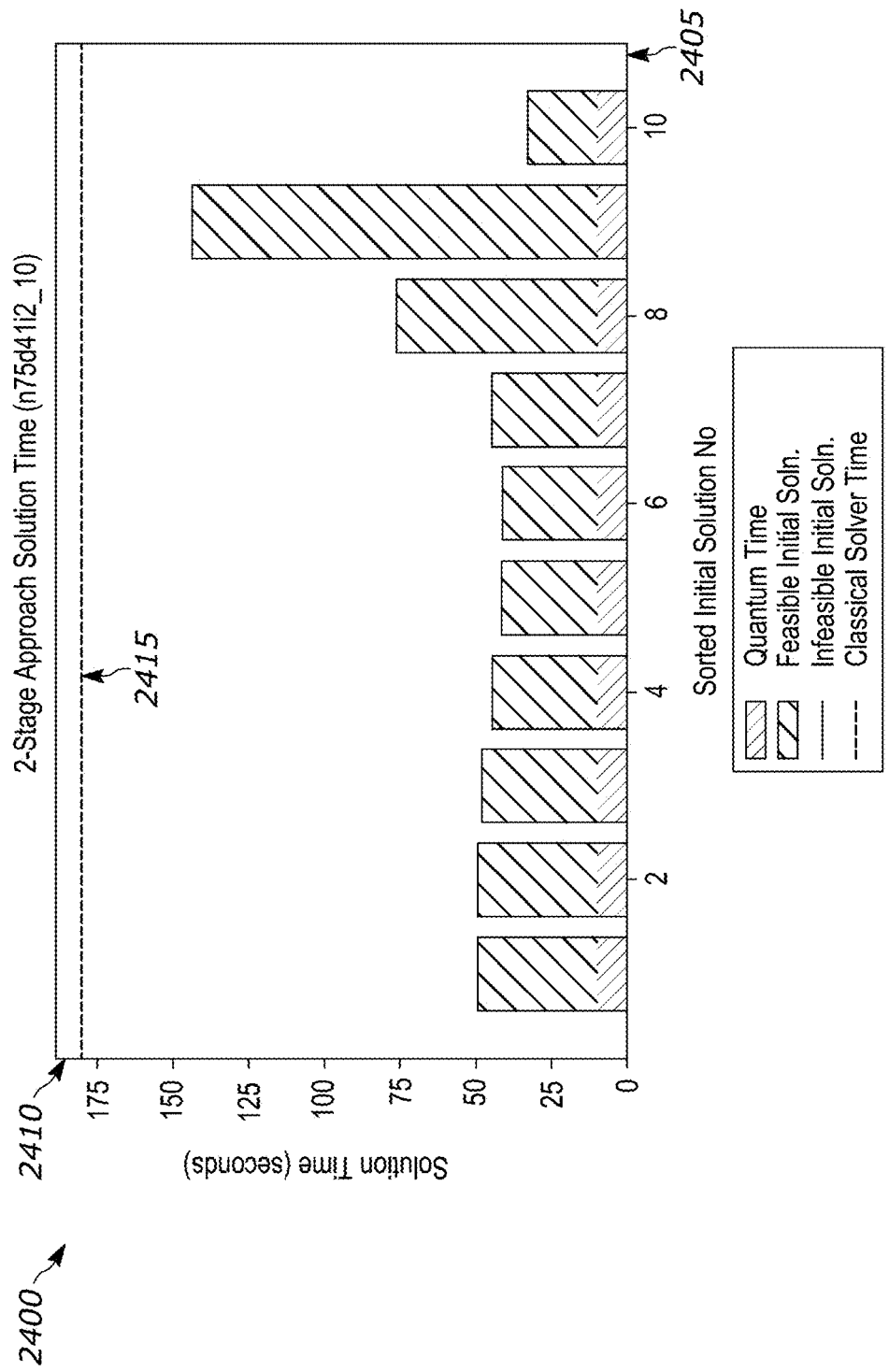
FIG. 24 is another example graph comparing a difference in time taken to solve an optimization program in the proposed hybrid quantum/nonquantum computing system versus a conventional nonquantum computing device, according to embodiments of the present technology.

Referring to FIG. 24, an example graph 2400 comparing a solution time for one optimization program between the proposed hybrid quantum/nonquantum computing system and a conventional nonquantum computing device is shown, in accordance with some embodiments of the present disclosure. The graph 2400 plots ten solutions selected from a plurality of solutions generated by the proposed approach along X-axis 2405 against a solution time in seconds on Y-axis 2410. A line 2415 on the graph 2400 shows the time the nonquantum computing solver took to solve the optimization program. The same optimization program was also solved using the proposed approach. Since the quantum computing solver generates multiple solutions, the inventors selected ten best solutions from the quantum computing solver and input them into the nonquantum computing solver. The solutions plotted on the X-Axis 2405 show the results for each of those ten solutions from the nonquantum computing solver. As seen from the graph 2400, each of the ten solutions took significantly less time than the conventional nonquantum computing solver approach. Of the total time taken by each solution using the proposed approach, only a fraction of the time was consumed by the quantum computing solver.

Figure 25:
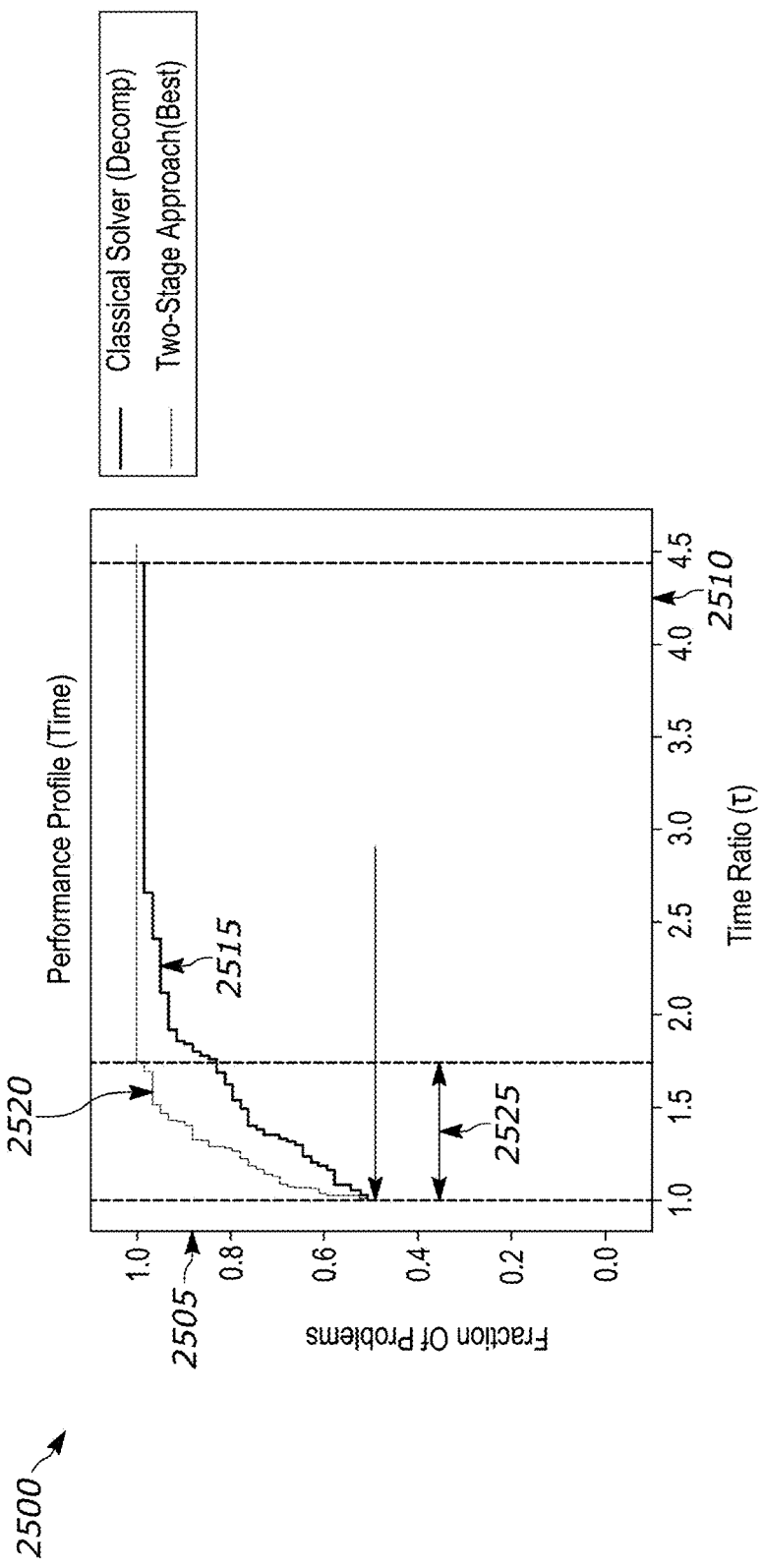
FIG. 25 is an example graph comparing a difference in performance between the proposed hybrid quantum/nonquantum computing system and a conventional nonquantum computing device, according to embodiments of the present technology.

Referring to FIG. 25, another example graph 2500 shows a performance profile comparing the proposed approach with the conventional nonquantum computing device. The graph 2500 plots the fraction of problems solved on Y-Axis 2505 against a ratio between fastest and slowest solve times on X-axis 2510. The graph 2500 shows a first plot 2515 for the conventional nonquantum computing device and a second plot 2520 for the proposed approach. As seen from the graph 2500, the second plot 2520 consistently outperforms the conventional nonquantum computing device eventually solving 100% of the problems. The proposed approach is at least 1.7 times faster than the conventional nonquantum computing device to solve 80% of the problems and 4.5 times faster than the conventional nonquantum computing device to solve 100% of the problems. The bowing of the first plot 2515 and the second plot 2520 in the section 2525 represents the highest number of problems solved in the shortest amount of time.

Figure 26:
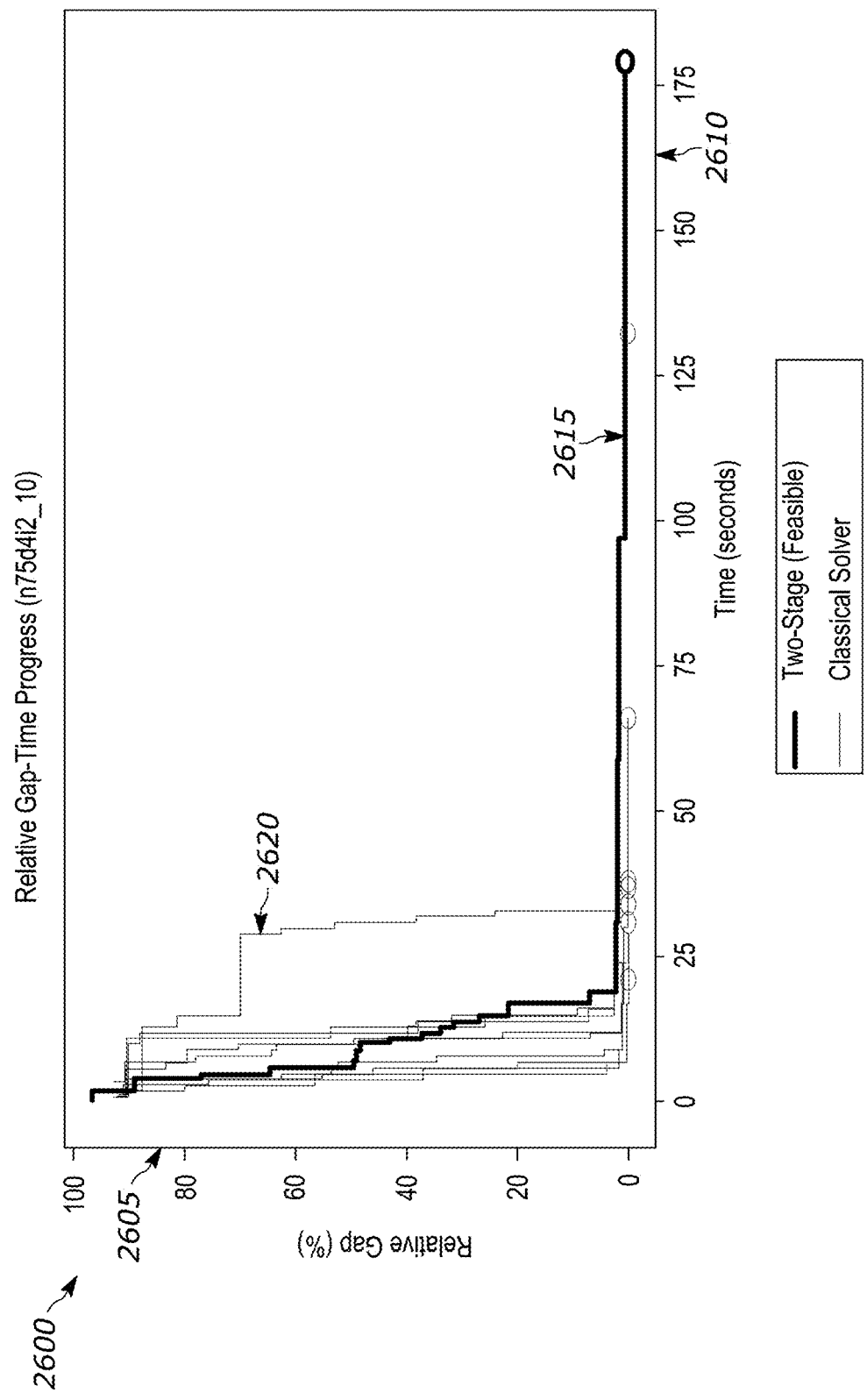
FIG. 26 is another example graph comparing a difference in performance between the proposed hybrid quantum/nonquantum computing system versus a conventional nonquantum computing device, according to embodiments of the present technology.

Referring now to FIG. 26, an example graph 2600 shows a relative gap as a function of time, in accordance with some embodiments of the present disclosure. Relative gap may be measured as:

$$\text{Relative gap} = (\text{Best Solution Objective} - \text{Bound}) / \text{Bound} \quad \text{Equation 4}$$

The graph 2600 plots the relative gap on Y-Axis 2605 against time in seconds on X-Axis 2610. The relative gap may assess accuracy of the optimal solution. After nonquantum computing devices find an initial solution, they take that solution and compare it to the computed theoretical best solution. That difference is the relative gap. The nonquantum computing device spends a lot of time refining the solution and making the comparison in an iterative process until either a time limit is reached, or the relative gap is eliminated proving the solution was the absolute best. The proposed approach does not need to do this iterative process. Once an optimal solution is found in the proposed approach, that solution is added to the final solution set. Therefore, the two-stage approach takes these quantum solutions as starting points into classical in part to try to minimize this gap faster potentially finding better accuracy.

A first plot 2615 shows the time it took a nonquantum computing device to minimize the gap for solving a plurality of optimization programs. The greater the bowing to the left, the faster was the relative gap minimized. A second plot 2620 shows the time it took the proposed approach to minimize the relative gap for solving the same optimization programs. For almost each optimization program, the proposed approach took significantly less than to minimize the relative gap than the nonquantum computing device.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium comprising computer-readable instructions stored thereon that when executed by a processor cause the processor to:
   reformulate an optimization program as a Quadratic Unconstrained Binary Optimization (QUBO) model; and
   in a single iteration, solve the optimization program by:
     inputting the QUBO model into a quantum computing solver;
       instructing the quantum computing solver to generate a plurality of solutions to the optimization program based on the QUBO model, wherein each solution of the plurality of solutions is either an infeasible solution or a feasible solution;
     receiving the plurality of solutions from the quantum computing solver;
     inputting each of the plurality of solutions into a nonquantum computing solver, wherein the nonquantum computing solver uses each of the plurality of solutions as a starting point to continue solving the optimization program, wherein responsive to determining that a solution of the plurality of solutions is an infeasible solution, the nonquantum computing solver is configured to run a repair heuristic on the solution to convert the infeasible solution into a feasible solution, and wherein responsive to determining that the infeasible solution cannot be converted into the feasible solution, the nonquantum computing solver is configured to ignore the solution and start execution of the optimization program from scratch; and
     outputting an optimal solution to the optimization program from the nonquantum computing solver.

2. A non-transitory computer-readable medium comprising computer-readable instructions stored thereon that when executed by a processor cause the processor to:
   reformulate an optimization program as a Quadratic Unconstrained Binary Optimization (QUBO) model, wherein to reformulate the optimization program as the QUBO model, the computer-readable instructions further cause the processor to define an objective function for the optimization program as: $f(x)=\Sigma_i Q_{i,i} X_i + \Sigma_{i<j} Q_{i,j} X_i X_j$, where $f(x)$ is the objective function, Q is a square matrix having n rows and n columns, i is a row and j is a column of Q, X is a vector of binary variables, $Q_{i,i}$ are linear coefficients, and $Q_{i,j}$ are quadratic coefficients; and
   in a single iteration, solve the optimization program by:
     inputting the QUBO model into a quantum computing solver;
   instructing the quantum computing solver to generate a plurality of solutions to the optimization program based on the QUBO model, wherein each solution of the plurality of solutions is either an infeasible solution or a feasible solution;
     receiving the plurality of solutions from the quantum computing solver;
     inputting each of the plurality of solutions into a nonquantum computing solver, wherein the nonquantum computing solver uses each of the plurality of solutions as a starting point to continue solving the optimization program, wherein responsive to determining that the infeasible solution cannot be converted into the feasible solution, the nonquantum computing solver is configured to ignore the solution and start execution of the optimization program from scratch; and outputting an optimal solution to the optimization program from the nonquantum computing solver.

3. The non-transitory computer-readable medium of claim 1, wherein each of the plurality of solutions generated by the quantum computing solver comprises a variable name for each variable in the QUBO model, a variable value for each variable name, an energy value, a frequency value, a constraint list, and a feasibility flag indicating whether a solution of the plurality of solutions is feasible or infeasible.

4. The non-transitory computer-readable medium of claim 1, wherein the nonquantum computing solver processes each of the plurality of solutions in parallel to obtain the optimal solution.

5. The non-transitory computer-readable medium of claim 1, wherein the nonquantum computing solver processes each of the plurality of solutions serially.

6. The non-transitory computer-readable medium of claim 1, wherein the nonquantum computing solver is configured to execute a branch and cut algorithm on each feasible solution to determine the optimal solution to the optimization program.

7. The non-transitory computer-readable medium of claim 1, wherein responsive to converting the infeasible solution into the feasible solution to obtain a converted feasible solution, the nonquantum computing solver is configured to execute a branch and cut algorithm on the converted feasible solution.

8. The non-transitory computer-readable medium of claim 2, wherein the computer-readable instructions further cause the processor to:
determine whether a solution of the plurality of solutions is an infeasible solution, wherein responsive to determining that the solution of the plurality of solutions is an infeasible solution, the nonquantum computing solver is configured to run a repair heuristic on the solution to convert the infeasible solution into a feasible solution; and
determine whether the solution of the plurality of solutions cannot be converted into the feasible solution.

9. The non-transitory computer-readable medium of claim 6, wherein the nonquantum computing solver is further configured to set an upper or lower bound of an objective function associated with the optimization program before executing the branch and cut algorithm.

10. The non-transitory computer-readable medium of claim 1, wherein the quantum computing solver is a quantum annealer and the nonquantum computing solver is a mixed integer linear optimization solver.

11. The non-transitory computer-readable medium of claim 1, wherein the quantum computing solver is a quantum annealer and the nonquantum computing solver is a mixed integer non-linear optimization solver.

12. A system comprising:
a memory having computer-readable instructions stored thereon; and
a processor that executes the computer-readable instructions to:
reformulate an optimization program as a Quadratic Unconstrained Binary Optimization (QUBO) model; and
in a single iteration, solve the optimization program by:
inputting the QUBO model into a quantum computing solver;
instructing the quantum computing solver to generate a plurality of solutions to the optimization program based on the QUBO model, wherein each solution of the plurality of solutions is either an infeasible solution or a feasible solution;
receiving the plurality of solutions from the quantum computing solver;
inputting each of the plurality of solutions into a nonquantum computing solver, wherein the nonquantum computing solver uses each of the plurality of solutions as a starting point to continue solving the optimization program, wherein responsive to determining that a solution of the plurality of solutions is an infeasible solution, the nonquantum computing solver is configured to run a repair heuristic on the solution to convert the infeasible solution into a feasible solution, and wherein responsive to determining that the infeasible solution cannot be converted into the feasible solution, the nonquantum computing solver is configured to ignore the solution and start execution of the optimization program from scratch; and
outputting an optimal solution to the optimization program from the nonquantum computing solver.

13. The system of claim 12, wherein to reformulate the optimization program as the QUBO model, the computer-readable instructions further cause the processor to define an objective function for the optimization program as: $f(x) = \Sigma_i Q_{i,i} X_i + \Sigma_{i<j} Q_{i,j} X_i X_j$, where $f(x)$ is the objective function, Q is a square matrix having n rows and n columns, i is a row and j is a column of Q, X is a vector of binary variables, $Q_{i,i}$ are linear coefficients, and $Q_{i,j}$ are quadratic coefficients.

14. The system of claim 12, wherein each of the plurality of solutions generated by the quantum computing solver comprises a variable name for each variable in the QUBO model, a variable value for each variable name, an energy value, a frequency value, a constraint list, and a feasibility flag indicating whether a solution of the plurality of solutions is feasible or infeasible.

15. The system of claim 12, wherein the nonquantum computing solver processes each of the plurality of solutions in parallel or serially to obtain the optimal solution.

16. The system of claim 12, wherein the nonquantum computing solver is configured to execute a branch and cut algorithm on each feasible solution to determine the optimal solution to the optimization program.

17. The system of claim 12, wherein responsive to converting the infeasible solution into the feasible solution to obtain a converted feasible solution, the nonquantum computing solver is configured to execute a branch and cut algorithm on the converted feasible solution.

18. The non-transitory computer-readable medium of claim 2, wherein the quantum computing solver is a quantum annealer and the nonquantum computing solver is a mixed integer non-linear optimization solver.

19. The system of claim 16, wherein the nonquantum computing solver is further configured to set an upper or lower bound of an objective function associated with the optimization program before executing the branch and cut algorithm.

20. The system of claim 12, wherein the quantum computing solver is a quantum annealer and the nonquantum computing solver is a mixed integer linear optimization solver.

21. The system of claim 12, wherein the quantum computing solver is a quantum annealer and the nonquantum computing solver is a mixed integer non-linear optimization solver.

22. A method comprising:
reformulating, by a processor executing computer-readable instructions stored on a memory, an optimization program as a Quadratic Unconstrained Binary Optimization (QUBO) model; and
in a single iteration, solving, by the processor, the optimization program by:
  inputting, by the processor, the QUBO model into a quantum computing solver;
  instructing, by the processor, the quantum computing solver to generate a plurality of solutions to the optimization program based on the QUBO model, wherein each solution of the plurality of solutions is either an infeasible solution or a feasible solution;
  receiving, by the processor, the plurality of solutions from the quantum computing solver;
  inputting, by the processor, each of the plurality of solutions into a nonquantum computing solver, wherein the nonquantum computing solver uses each of the plurality of solutions as a starting point to continue solving the optimization program, wherein responsive to determining that a solution of the plurality of solutions is an infeasible solution, the nonquantum computing solver is configured to run a repair heuristic on the solution to convert the infeasible solution into a feasible solution, and wherein responsive to determining that the infeasible solution cannot be converted into the feasible solution, the nonquantum computing solver is configured to ignore the solution and start execution of the optimization program from scratch; and
  outputting, by the processor, an optimal solution to the optimization program from the nonquantum computing solver.

23. The method of claim 22, wherein to reformulate the optimization program as the QUBO model, the method further comprises defining, by the processor, an objective function for the optimization program as: $f(x) = \Sigma_i Q_{i,i} X_i + \Sigma_{i<j} Q_{i,j} X_i X_j$, where f(x) is the objective function, Q is a square matrix having n rows and n columns, i is a row and j is a column of Q, X is a vector of binary variables, $Q_{i,i}$ are linear coefficients, and $Q_{i,j}$ are quadratic coefficients.

24. The method of claim 22, wherein each of the plurality of solutions generated by the quantum computing solver comprises a variable name for each variable in the QUBO model, a variable value for each variable name, an energy value, a frequency value, a constraint list, and a feasibility flag indicating whether a solution of the plurality of solutions is feasible or infeasible.

25. The method of claim 22, wherein the nonquantum computing solver processes each of the plurality of solutions in parallel or serially to obtain the optimal solution.

26. The method of claim 22, wherein the nonquantum computing solver is configured to execute a branch and cut algorithm on each feasible solution to determine the optimal solution to the optimization program.

27. The method of claim 22, wherein responsive to converting the infeasible solution into the feasible solution to obtain a converted feasible solution, the nonquantum computing solver is configured to execute a branch and cut algorithm on the converted feasible solution.

28. The non-transitory computer-readable medium of claim 2, wherein the quantum computing solver is a quantum annealer and the nonquantum computing solver is a mixed integer linear optimization solver.

29. The method of claim 26, wherein the nonquantum computing solver is further configured to set an upper or lower bound of an objective function associated with the optimization program before executing the branch and cut algorithm.

30. The method of claim 22, wherein the quantum computing solver is a quantum annealer and the nonquantum computing solver is a mixed integer linear or non-linear optimization solver.

* * * * *